United States Patent
Keinan et al.

(10) Patent No.: US 7,130,763 B2
(45) Date of Patent: Oct. 31, 2006

(54) IDENTIFICATION OF EFFECTIVE ELEMENTS IN COMPLEX SYSTEMS

(75) Inventors: Alon Keinan, Petach-Tikva (IL); Isaac Meilijson, Hod HaSharon (IL); Eytan Ruppin, Reut (IL)

(73) Assignee: Ramot At Tel Aviv University Ltd., Tel-Aviv (IL)

( * ) Notice: Subject to any disclaimer, the term of this patent is extended or adjusted under 35 U.S.C. 154(b) by 0 days.

(21) Appl. No.: 10/541,455

(22) PCT Filed: Jan. 7, 2004

(86) PCT No.: PCT/IL2004/000013

§ 371 (c)(1),
(2), (4) Date: Nov. 30, 2005

(87) PCT Pub. No.: WO2004/061548

PCT Pub. Date: Jul. 22, 2004

(65) Prior Publication Data

US 2006/0167654 A1      Jul. 27, 2006

Related U.S. Application Data

(60) Provisional application No. 60/438,330, filed on Jan. 7, 2003.

(51) Int. Cl.
*G06F 19/00* (2006.01)
(52) U.S. Cl. ........................................ 702/182; 714/25
(58) Field of Classification Search ................ 702/182, 702/183–185, 188; 714/1, 2, 25; 706/6
See application file for complete search history.

(56) References Cited

U.S. PATENT DOCUMENTS 6,640,204 B1 *  10/2003  Feldman ...................... 702/189

* cited by examiner

*Primary Examiner*—Edward Raymond

(57) ABSTRACT

Apparatus for analysis of a complex system comprising elements to determine the effective elements of a system in carrying out a given task, the apparatus comprising: a sampler for carrying out successive silencing operations comprising silencing elements and combinations of elements of the system and measuring results of the given task, a predictor for providing predictions for predicting results for the given task for further element silencing combinations, and a contributions calculator for using said measured results and said predicted results to generate Shapley value predictions for said elements as indicators of an effectiveness of a respective element in carrying out the given task.

13 Claims, 21 Drawing Sheets

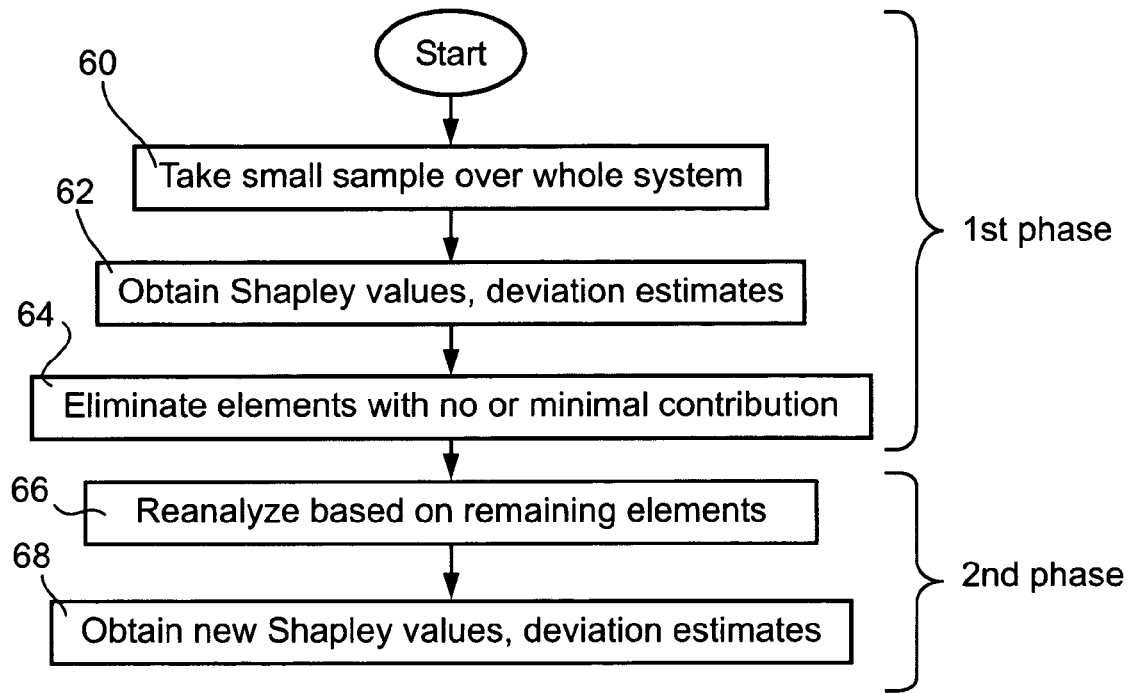

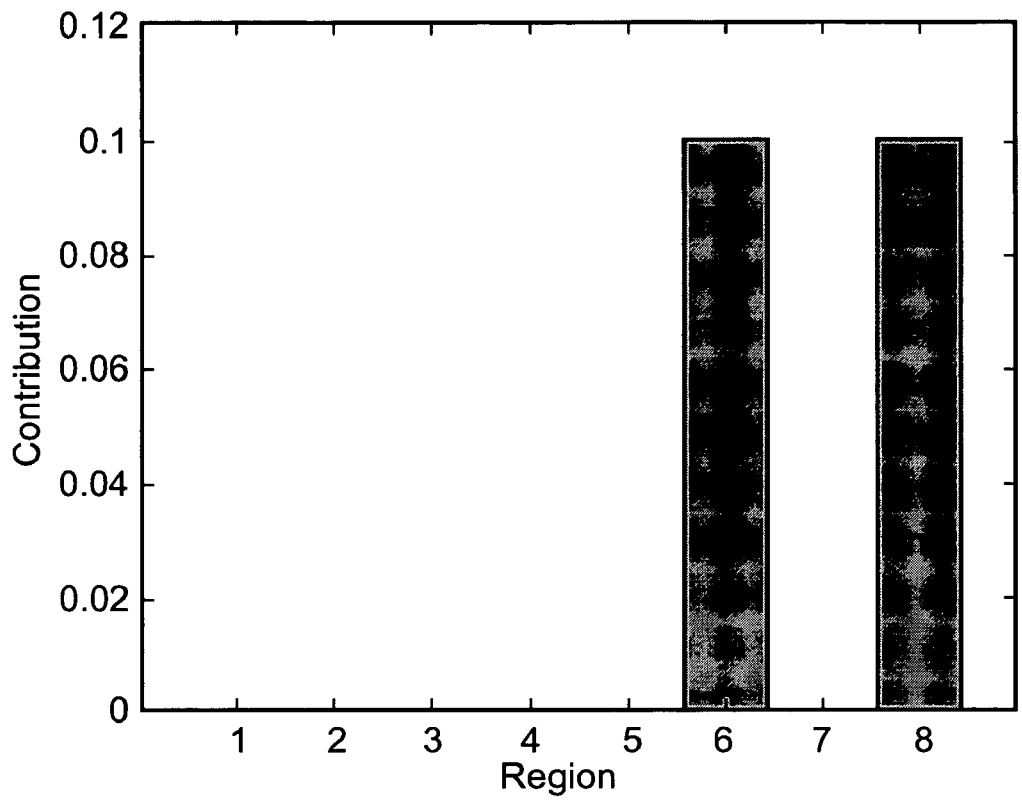
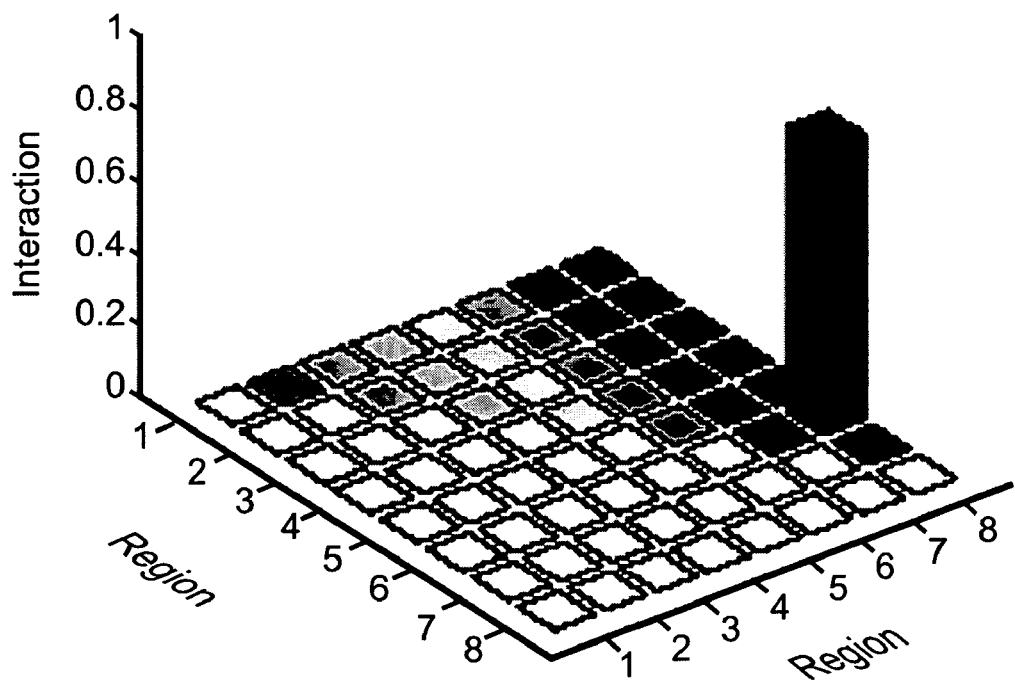
Fig. 21

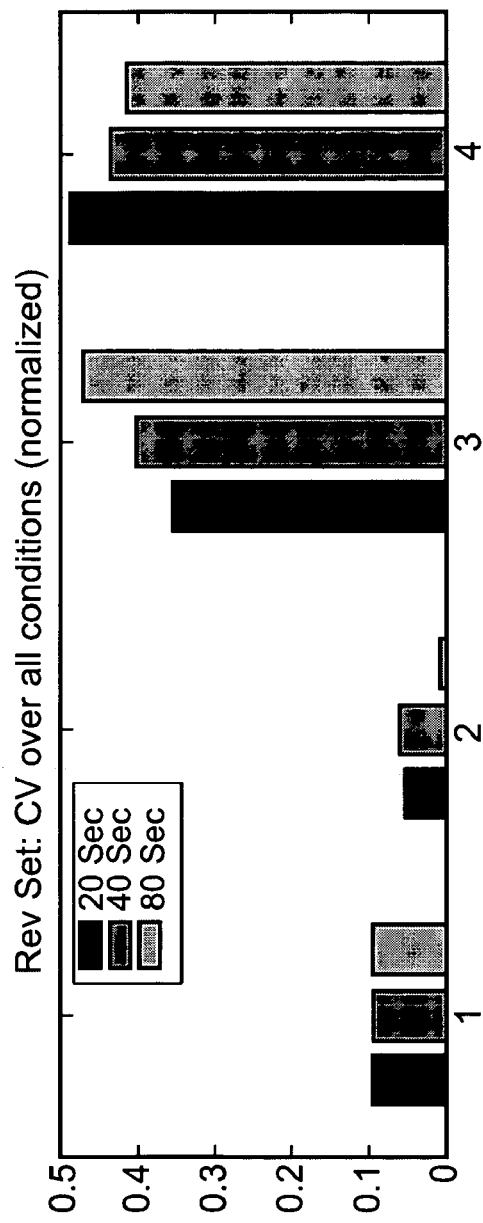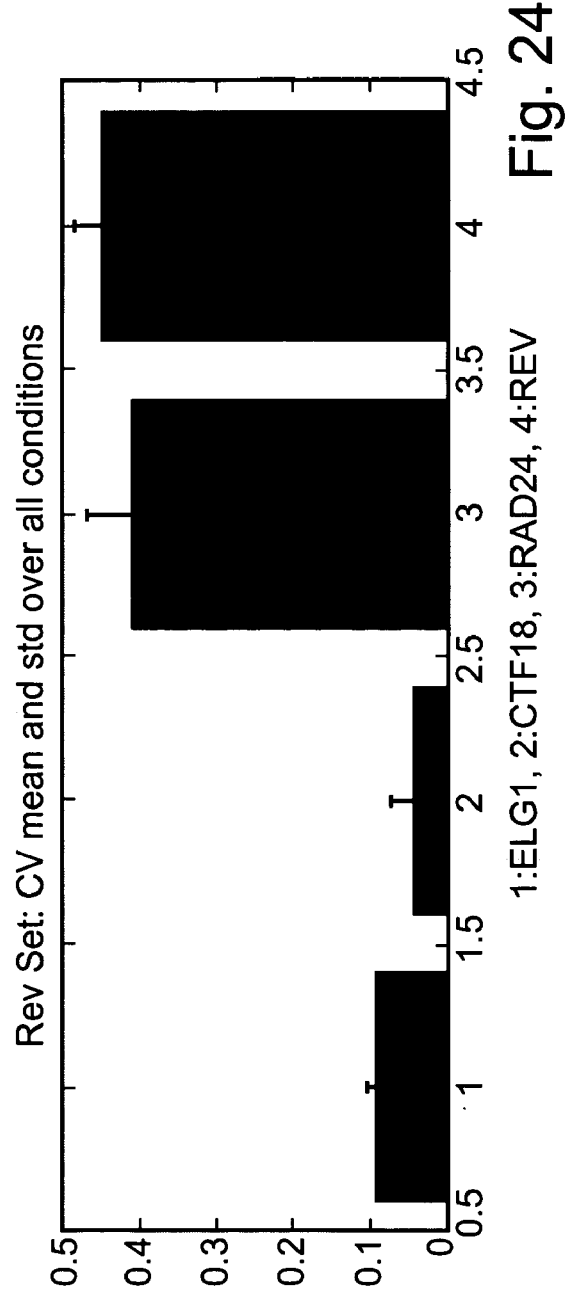
Fig. 24

IDENTIFICATION OF EFFECTIVE ELEMENTS IN COMPLEX SYSTEMS

RELATED PATENT APPLICATION

This application is a National Phase Application of PCT/IL2004/000013 having International Filing Date of 7 Jan. 2004, which claims the benefit of U.S. Provisional Patent Application No. 60/438,330 filed 7 Jan. 2003. The contents of the above Application are all incorporated herein by reference.

FIELD AND BACKGROUND OF THE INVENTION

The present invention relates to a method and apparatus for identification of effective elements in complex systems, and, more particularly, but not exclusively to a method and apparatus that samples the activity of the complex system under selective silencing of elements and analyzes the results.

The "effective elements" approach to complex systems has its roots in computational neuroscience, and is derived from the research of the present inventors into the analysis of localization of function in neural networks. The classical problem of localization of function essentially translates to trying to answer the question, "which system elements contribute to a given task performed by a network/agent/animal?". The problem is a very difficult one, in neuroscience as well as in genetic and metabolic networks studied in functional genomics, since the network investigated may be capable of performing multiple and unrelated tasks, often in parallel, and individual elements may have functions that interrelate with other elements etc. Each task recruits some of the elements of the system, and often the same element participates in several tasks. This poses a very serious challenge when one attempts to identify the roles of the network elements, and to assess their contributions to the different tasks.

In neuroscience research there have traditionally been two main conceptual approaches aimed at addressing the central question of function localization. The first is termed the Correlational approach; employing various analysis methods it correlates between measurements such as electrical recordings of neural activity or functional imaging intensities on the one hand and other indices of network/agent performance on the other. With the correlational approach, it is difficult to correctly identify the "core set" of elements that contribute exclusively to the task in hand and hence are those responsible for it. This is because additional elements that are not really in the core set may be activated by core set elements and show high correlations with the task measured, even though they are in fact making no contribution whatsoever, and hence may be falsely included in the core set by such a correlational method. To overcome these inherent shortcomings, another parallel approach has been traditionally taken in neuroscience. This approach, known as the lesioning or silencing approach, has its roots in classical systems analysis theory, where the structure and dynamics of a system are studied by inducing lesions that perturb the system from its normal functioning state and then track its corresponding behavior. In contradistinction to the correlational approach, Lesioning in principle enables one to correctly identify the system elements that are really responsible for a given task, and to precisely quantify their respective contributions.

Because of the significant difficulties involved in conducting lesioning experiments in animals, the large majority of these studies have employed single lesions, where only one element of the system is ablated at any given time. Such single lesions (or, their conceptually equivalent "single knockout" experiments in functional genomics) are very limited in their ability to reveal the significance of elements which interact in complex ways in network processing. For example, when two elements have a high degree of redundancy with respect to the processing of a function to which they equally contribute, lesioning either element alone will not reveal its true significance, since no reduction in function performance will occur. Each time the function of the lesioned element will be fulfilled by the other element and the two elements will appear to be ineffective even though this is far from the truth.

The problematic and limited value of single lesion analysis has already been widely noted in neuroscience literature. Another classic example is the paradoxical lesioning effect, where lesioning area A alone is harmful but lesioning area A given that area B is lesioned is beneficial, hence the apparent "paradox". Importantly, it demonstrates that looking at a single lesion alone may be misleading, as the beneficial influence of an area depends on the general state of the system.

Given these inherent limitations of the single lesioning approach, it became clear to us more than two years ago that if one wants to obtain a precise description of how a given function is localized in a network performing that function, then two basic things should be done: First, one has to perform multi-lesioning (or, in functional genomics, multi-silencing) perturbation experiments to the system examined. In each such experiment, a set of elements is lesioned concurrently, and the resulting performance of the network is recorded. Second, after gathering a data set composed of many such multi-lesioning experiments and their corresponding performance measurements, one needs to find a method of analysis capable of using the data from numerous multi-lesioning experiments, and computing the contributions of each of the elements to the function (task) studied. The analysis should be capable of taking into account that some, if not many of the elements in the system may make vanishingly small contributions to any given task.

In previous work, the present inventors developed a novel Functional Contribution Analysis (FCA). The FCA multi-lesioning framework gives a rigorous, operative definition for the neurons' contributions to the system's performance in various tasks, and an algorithm for multi-lesion analysis to measure them by minimizing the performance prediction error over unseen test lesions data. The FCA was developed and studied in the theoretical modeling framework of neurally-driven evolved autonomous agents (EAAs).

The FCA enabled initial multi-lesion analysis of some simple small neurocontroller neural networks that had emerged in EAA networks. However, it was not sufficiently accurate and powerful for the analysis of biological "paradoxical" lesioning data of auditory processing in cats, see hereinbelow. Moreover, the conceptual core of the FCA is an operational definition, attempting to minimize the performance prediction error of the algorithm on new, unseen lesions. As such, there is no inherent notion of correctness of the solutions found, and the uniqueness of the solution is not guaranteed. Thus direct use of the FCA does not in fact characterize the contributions of individual elements.

There is thus a widely recognized need for, and it would be highly advantageous to have, a system for the analysis of the effectiveness of elements in a complex system which is devoid of the above limitations and in particular does provide a unique solution for a given input.

SUMMARY OF THE INVENTION

According to one aspect of the present invention there is provided apparatus for analysis of a complex system comprising elements, to determine the effective elements of a system in carrying out a given task, the apparatus comprising:

a sampler for sampling a system to which successive silencing operations comprising silencing elements and combinations of elements of the system are applied under said given task to obtain sampling results, a predictor for providing predictions for predicting results for the given task for further element silencing combinations, and a contributions calculator for using said measured results and said predicted results to generate Shapley value predictions for said elements as indicators of an effectiveness of a respective element in carrying out the given task.

Preferably said predictor is trainable on said sampling results.

Preferably, said predictor is operable to complete said measured results by predicting further results to produce a complete overall set of measured and predicted results representing all possible silencing combinations of said elements in said system, said complete set of outputs being usable within said contributions calculator for calculations of Shapley values for each element.

In one embodiment, the predictor tool comprises Functional Contribution Analysis (FCA).

Additionally or alternatively, the predictor tool projection pursuit regression (PPR). It will be appreciated that the predictor may in fact be any kind of effective prediction tool that can be trained and make reasonable predictions on multi-silencing data.

The apparatus may further comprise a statistical deviation calculator, associated with at least one of said system analyzer and said predictor, and configured to use confidence interval type analysis to indicate a sufficient number of results to enable statistically meaningful Shapley values to be calculated.

The complex system may be any one of an economic system, a biological system, a virtual system, a physical system, a chemical system, a control system, a system comprising neural networks, neurological system, a biochemical system, a genetic system, an electronic system, and a cost-based system.

Preferably, said successive silencing operations are any one of a group comprising lesion operations, reversible lesion operations, multi-gene knockout operations, mutation operations, RNA interference operations, Transcranial Magnetic Stimulation (TMA) operations, physical shutdown operations, biochemical interference activity, perturbation analysis, and bioelectrical interference activity.

The apparatus may further comprise an eliminator, located between said predictor and said contributions calculator for using outputs of said contributions calculator to identify elements providing minimal contribution, to eliminate said elements at said predictor and to operate said predictor to make new predictions for combinations of elements determined to be significant, thereby to provide a two-stage analysis process.

According to a second aspect of the present invention there is provided a method for analysis of a complex system comprising elements to determine the effective elements of a system in carrying out a given task, the method comprising:

carrying out successive silencing operations comprising silencing elements and combinations of elements of the system, measuring results of the given task under respective silencing operations, providing predictions for predicting results for the given task for further element silencing combinations, and using said measured results and said predicted results to generate Shapley value predictions for said elements as indicators of an effectiveness of a respective element in carrying out the given task.

According to a third aspect of the present invention there is provided apparatus for genomic analysis of a genetic system comprising a plurality of genetic elements, each element being a genetic element being silenceable via genetic knockout operations to determine the effective elements of a system in carrying out a given task, the apparatus comprising:

genetic knockout unit for carrying out successive silencing operations comprising silencing combinations of at least one of selected genetic elements, a sampler for measuring results of the given task following a given silencing combination, a predictor for providing predictions for predicting results for the given task for further element silencing combinations, and a contributions calculator for using said measured results and said predicted results to generate Shapley value predictions for said genetic elements as indicators of an effectiveness of a respective genetic element in carrying out the given task.

Preferably, said genetic knockout operation is silencing of a corresponding RNA pathway and said genetic knockout unit is an RNA interference unit.

Additionally or alternatively, said genetic knockout operation is mutation and said genetic knockout unit is a mutator.

According to a fourth aspect of the present invention there is provided a method for pruning a neural network comprising:

carrying out successive silencing operations on combinations of elements of said neural network, using a Shapley value predictor for predicting Shapley values for elements of said neural network, and pruning said network by successively removing elements having lowest contribution values to said network as indicated by their corresponding Shapley values, until a stop condition is reached.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 5 is a simplified flow chart illustrating two-phase Shapley analysis according to a further preferred embodiment of the present invention;

FIGS. 6, 7 and 8 are illustrations in Venn diagram format of equations indicating non-linear contributions of elements to a task;

FIG. 21 is a graph illustrating the results of tracing sound directions following reversible silencing on cats' brains;

FIGS. 23–26 are graphs illustrating the results of genome analysis on the DNA repair pathway in yeast cells;

DESCRIPTION OF THE PREFERRED EMBODIMENTS

Figure 1:
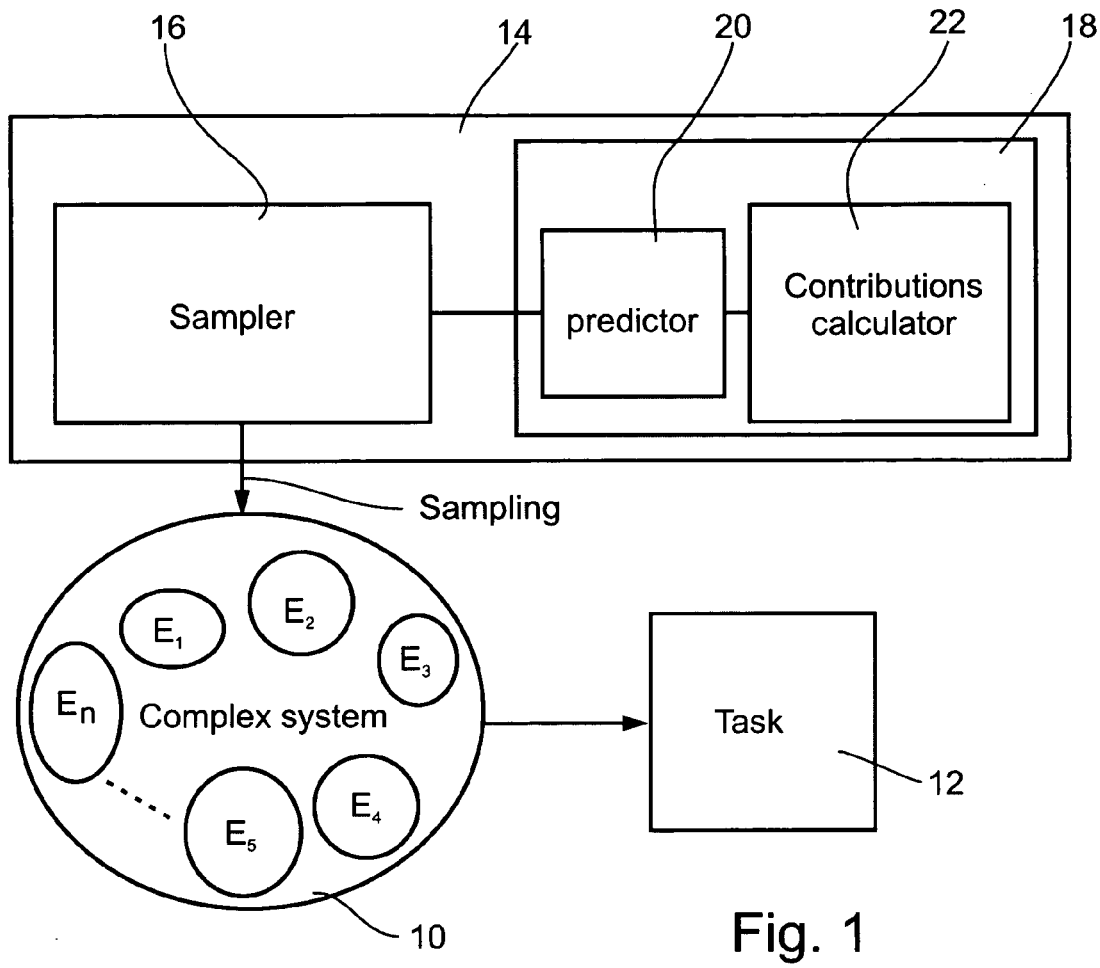
FIG. 1 is a simplified diagram showing a generalized embodiment of analysis apparatus according to the present invention.

The present embodiments comprise an apparatus and method for sampling the activity of a complex system when different combinations of constituent elements have been silenced, for making predictions of a Shapley value for each element of the system based on the sampling, and for using those Shapley values as indications of the effective contribution of the given element to the task under consideration.

The principles and operation of a Shapley value prediction-based effectiveness estimator according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which illustrates a generalized embodiment of apparatus for multi-silencing analysis according to the present invention. A complex system 10 comprises numerous elements E1 to En. The complex system 10 is able to perform a task or achieve a result 12, but the role of the individual elements in the overall result is not fully understood. Thus some of the elements may make no contribution to the result. Others may make larger or smaller contributions and others may make contributions only in synergy with other elements or only in the absence of other elements. Analyzer apparatus 14 has the task of sampling and analyzing complex system 10 to determine the relative importance of the constituent elements in achieving result 12.

It is noted that complex system 10 may be any complex arrangement of elements, including a physical system, a biological system, an economic system, a game scenario, a computerized model or a virtual system, or subsets of any of the above, or numerous others.

The apparatus includes a sampler 14 which carries out multi-silencing on the complex system 10. That is to say it shuts off individual elements E1 to En and combinations thereof and measures the task under the various combinations of shut off elements. Now for a complex system of n elements, the number of combinations of elements to be shut down is 2n, which quickly becomes unmanageable even for relatively small n. Thus if there is any complexity in shutting down the elements and measuring the task, then it is not practical to attempt all of the combinations of shut-down. The sampler therefore samples the system for a representative combination of elements being shut down or silenced. A representative sampling system will be explained in greater detail hereinbelow.

Once sample results are available, they are passed to Shapley unit 18. The Shapley unit comprises a predictor 20 which uses the obtained values as the basis of a training process. The training process allows the predictor 20 to predict task results for the combinations not actually tested on the basis of the results obtained. The predictor is discussed in greater detail below. Both the predicted and actual results are then passed to contributions analyzer 22 which calculates what would be absolute Shapley values for the elements if only a complete set of actual results were available. The calculations carried out by the Shapley unit are presented in detail as equations below. However, as the greater part of the results are mere predictions, the output of the contributions analyzer is not a series of actual Shapley values but rather what we may term predicted Shapley values, for each element. The predicted Shapley values are indicators for the contribution of each element to the output of the complex system 10 under the given task 12.

Figure 2:
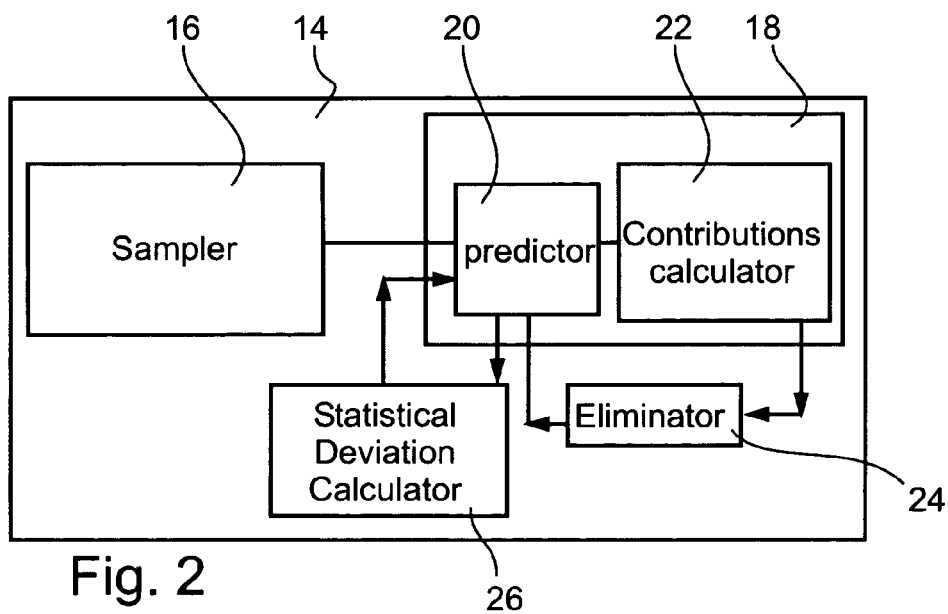
FIG. 2 is a simplified diagram showing a modification of the apparatus of FIG. 1 to accommodate cases in which prediction is not feasible for every combination and further to accommodate a two stage analysis.

Reference is now made to FIG. 2, which is a simplified diagram illustrating a further preferred embodiment of the present invention. In certain cases it is not practical to predict results for all possible combinations of the elements. Therefore a statistical analyzer is added to the system to measure statistical deviations over the existing results set. The system obtains actual samples as before and predictions are made of further results as before. The statistical calculator determines statistical deviations over the results and indicates when the deviation is below a predetermined acceptability threshold. Once the deviation is below the acceptability threshold a set of Shapley values may be obtained, and these are referred to herein as estimated predicted Shapley values.

An element eliminator 24 may additionally or alternatively be included. The eliminator operates after Shapley values have been calculated, and eliminates from the system under analysis those elements which make minimal contributions. The system minus the elements that have been eliminated can then be reanalyzed by the predictor and a new set of Shapley values calculated. As will be explained below such a two-phase Shapley calculation extends the ability of the system to deal with more complex systems.

The present embodiments, otherwise referred to as Multi-Silencing Analysis (MSA), overcomes the various problems and drawbacks presented in the background. First and foremost, MSA is based on a sound axiomatic foundation: Instead of directly attempting to minimize the prediction error, as with the FCA method, it uses the concept of Shapley values, which originates with Game theory, to construct a fair and canonical solution to the classic problem of attributing contribution values to the individual system elements. Within a set of very general axioms the Shapley solution found is known to be unique and in essence, optimally fair.

Now a disadvantage of Shapley values in traditional Game theory is that the Shapley value has remained a theoretical tool since it requires full knowledge of the behavior of the system under all possible lesioning configurations. That is to say it requires the system outputs for every combination of elements, which is not generally possible in most real-life systems. However, as described above in respect of FIG. 1, the present embodiments make use of a novel method that permits the calculation of Shapley values from relatively small samples of the element silencing or lesioning space. Whilst such an innovation is less important in virtual systems where complete sampling of the complex is possible, it is more important if the methodology is to be extended to real world systems and especially biological systems where only a small subset of the possible element silencing is ever likely to be given in the data.

Second, in contradistinction to the prior art pure FCA method, the MSA is able to utilize a large spectrum of powerful predictor tools, for example Projection Pursuit Regression and thereby to obtain a much higher level of accuracy and scalability. That is to say the prediction tool that is used in prediction element 20 can be any predictor, without reference to the remainder of the apparatus. In summary, the MSA, in contrast with the FCA, has a sound theoretical basis and is much more powerful and accurate.

The MSA method has broad potential applications for a wide variety of cost allocation problems, for economic models in general, and for perturbation analysis of electronic circuits and devices. It has also broad potential applications to the analysis of biological data that is produced via lesioning of elements within the system, that is "knockout" measurements, using any "knockout" technique that may yield such data. One specific application for the MSA algorithm in the biology field is in functional genomics. Recent advances in post-transcriptional gene silencing via RNA interference (RNAi) have now made the prospect of multi-lesion genomic 'lesioning' datasets, together with measurements of corresponding cellular functions, a real possibility. (See, e.g., also www.ambion.com//hottopics/rnai/rnai_may2002_7.html for pertinent reviews). RNAi carries its action of suppressing DNA expression via post-transcriptional degradation of mRNA. This degradation quashes the expression of genes into proteins, and enables a much more ready way of knocking out individual genes and combinations of genes than was previously possible with laborious mutation techniques. Such an ability to readily and quickly create loss-of-function phenotypes offers new and exciting possibilities for researchers to learn more about the phenotypic functioning of silenced genes, even in mammalian cell cultures, and with potentially exciting applications to suppression of tumorigenecity. Just recently, RNAi research has been selected as the most important scientific breakthrough of the year by the journal Science (see www-.sciencemag.org/content/vol298/issue5602/#special). The closing of that editorial paper states that, "The extraordinary, although still unfulfilled, promise of small RNAs and RNAi has split the field wide open and put RNA at the center stage. Having exposed RNAs' hidden talents, scientists now hope to put them at work". Indeed, several new companies have emerged in the last one or two years, aiming to capitalize on these advancements in RNAi gene silencing methods. These include leading international companies like Intradigm, Alnylam Pharmaceuticals, Cenix Biosense, and in Israel, companies like QBI and Compugen.

In the following we disclose the workings of the MSA on one EAA and one biological neuroscience example, but first we discuss the inputs, operation and outputs of the MSA procedure itself, that is, what data does it work on and what insights does it provide. Datawise, the requirements are straightforward: Given a network of a few tens of interacting elements, one needs a dataset of multi-lesion experiments (say tens or hundreds of them, the precise number depending on the complexity of the network analyzed), each experiment including a measurement of the functional performance level of the complex system for each lesion combination. Given this data the MSA yields the following information:

The precise contribution of each element of the system to the task studied—for example, the precise contribution of each gene in a cellular metabolic network which is responsible for the expression of a drug receptor on the cell's membrane. It does so even when there is a large degree of redundancy between the functional contribution of different genes, and when complex interactions such as paradoxical lesioning exist. Importantly, the MSA approach is readily scalable to large systems because it can be implemented in a two-tier manner. The two tier procedure involves an initial analysis of the system as a whole, which identifies a few important elements, and then a secondary analysis which focuses solely on the interactions of the elements identified in the first stage. Furthermore, as will be explained, sampling may be carried out to effectively utilize small samples of the large silencing configuration space.

The subsets of the genes that co-interact in a significant manner—that is, following our example, the subsets of genes that together form pathways or submodules in the network, with respect to the specific receptor expression function studied.

After an initial set of multi-silencing combinations is carried out, the MSA can be run on the initial dataset to help in conducting the next phase of the experimental silencing study; that is, to identify the next set of multi-silencing configurations that should be performed. Given the data it has analyzed to that point, the MSA computes which future silencing configurations would be most efficient, i.e., produce the maximal amount of information describing function localization in the network.

It is noted that the set of multi-silencing configurations to be performed is preferably constructed in order to induce a dense even distribution of performance prediction values. This is done in the prediction phase in order that the predictor can provide a better calibrated tool.

A particular advantage of the sampling method involved in the present embodiments is that they allow the previously largely theoretical concept of the Shapley value to be the basis of a practical apparatus and method for estimating the contribution of elements in large-scale or complex systems where due to the size of the system only partial information about the costs or performance of various coalitions or multi-lesion configurations exists. The result has a large number of potential applications to cost allocation problems in business, economics, biology and engineering.

In the following we present a review of the FCA and its limitations, and then turn to describe the field of coalitional games, which the MSA framework is built upon. After a presentation of the analogy between coalitional games and the multi-lesion framework, methods for approximating the Shapley value of the game based on partial information available from multiple lesion experiments are presented.

A brief overview of the FCA algorithm is now given. The FCA uses as input performance measurements of a task over many multiple lesioning experiments. In each such experiment, a different lesioning configuration is imposed upon the complex system or network. Each configuration specifies which of the network elements are lesioned. The FCA algorithm is designed to use these data in order to search for a vector $c = (c_1, \ldots, c_n)$, where $c_i$ is defined to be the contribution value of element i to the task in question and n is the number of elements in the network. The goal of the FCA is to find such a vector that provides the best performance prediction in terms of Mean Squared Error (MSE), under all possible multiple site lesions (including new, unseen ones).

More formally, a lesioning configuration is denoted by a vector m where $m_i = 0$ if the element is lesioned, and $m_i = 1$ if it is intact. The prediction of performance in this lesioned state is based on a linear model generalized by a nonlinear transformation. Given a contribution vector c and a non-decreasing function f, the predicted performance $\tilde{p}_m$ when a lesion m is applied to the network is given by $$\tilde{P}_m = f(m \cdot c). \quad (1)$$

Denoting the actual performance under lesioning configuration m by $p_m$, the mean squared prediction error is $$MSE = \frac{1}{2^n} \sum_{\{m\}} (\tilde{p}_m - p_m)^2 \quad (2)$$

where the summation runs theoretically over all lesion configurations. A vector c which minimizes mean squared prediction error is defined as the contribution vector for the task tested, and the corresponding f is its adjoint performance prediction function. The performance prediction function f is a non-decreasing piecewise polynomial. It is non-decreasing to reflect the notion that beneficial elements (those whose lesioning results in performance deterioration) should have positive contribution values, and that negative values indicate elements that hinder performance. Since multiplying c and scaling f accordingly maintains the prediction, c is arbitrarily normalized such that $$\sum_{i=1}^{n} |c_i| = 1.$$

In practice, the goal of the FCA algorithm is to find a vector c and a performance prediction function f which minimize equation (2) given a subset of the full $2^n$ configurations set. The optimal c and f are determined using a training set of lesioning configurations m and the accompanying performance levels $p_m$.

Figure 3:
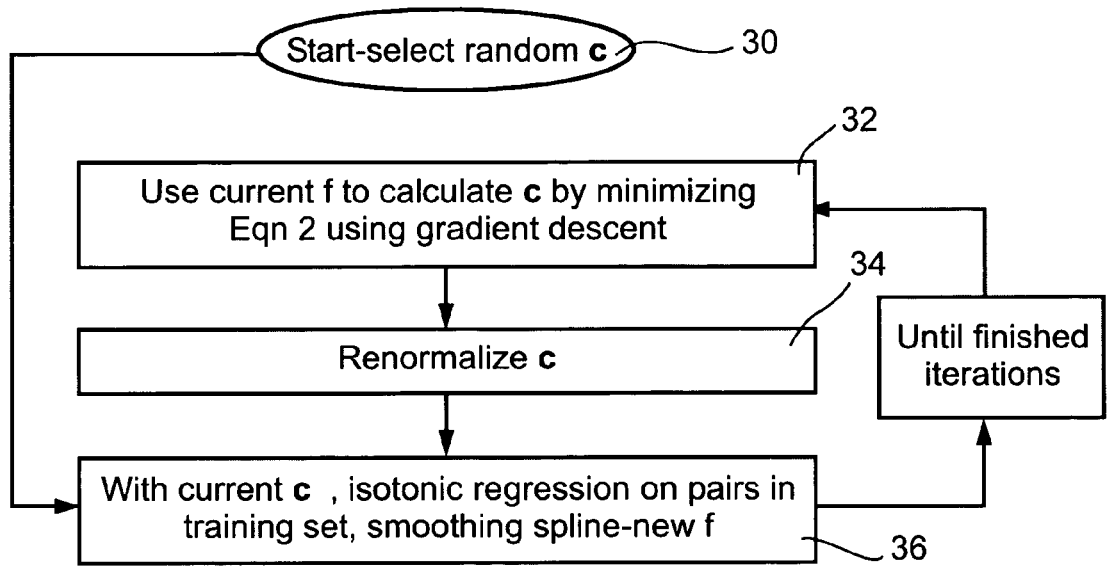
FIG. 3 is a simplified flow chart showing a prior art method for analyzing multi-silencing results.

Reference is now made to FIG. 3, which is a simplified flow chart illustrating the essential points of the FCA algorithm. The FCA algorithm works as follows:

30. Choose a random initial normalized contribution vector c for the task. From 30, jump to stage 36 below to compute f.

32. Compute c. Using the current f compute new values of c by minimizing (Eq. 2), using a gradient descent.

34. Re-normalize c, such that $$MSE = \frac{1}{2^n} \sum_{\{m\}} (\tilde{p}_m - p_m)^2 \quad (2)$$

36. Compute f. Given the current c, perform isotonic regression on the pairs $\{m \cdot c, p_m\}$ in the training set. Use a smoothing spline on the result of the regression to obtain a new f. The process flow now returns to stage 32.

Stages 32–36 are repeated for a fixed number of iterations.

The basic FCA has been extended to a high-dimensional analysis, using high-order compound elements. Such elements are composed of conjunctions of simple elements, and enable the explicit expression of sets of interdependent elements. That is, the contribution of each of the simple elements depends on the state of the other elements in the set. A compound element, like a simple element, is assigned a value aiming at MSE minimization on the training set.

It is noted that the c vector yielded by the FCA does not arise from any definition of the contributions of the set of elements in terms of some 'fairness' or 'optimality' criteria that can serve to justify it. Rather, the definition is an operative one: c is a vector which, along with the corresponding f function, reduces the error, in terms of MSE, to a local minimum when using the f(m·c) model to predict the lesioning configurations performance in the training set. The disadvantage of the FCA is inherent to the situation where the contributions calculation is an integral part of the prediction goal. The MSA framework of the present embodiments overcomes this shortcoming by decoupling the predictor from the contributions calculation as explained hereinbelow, enabling the use of a natural definition for the contributions.

Since the contributions calculation in the FCA is an integral part of the prediction component, one cannot test the statistical significance of the results and estimate the accuracy of the yielded contributions. The MSA framework of the present embodiments by contrast does allow for the estimation of both the contributions and, at the same time, the standard deviations of the contributions estimators, as will be explained below. Such a possibility allows for the construction of a confidence interval for each assigned contribution, at every stage of the contributions calculation. In cases where there are numerous elements this allows first to identify the significant elements and then focus on a more accurate calculation of their contributions, discarding the insignificant ones. Thus, in such cases, MSA scales up much better with the number of elements than FCA does.

As explained, the FCA algorithm starts with a random c vector and converges to a local minimum of the training set MSE. In practice, the algorithm often converges to the same solution in different runs although starting from different vectors. There are cases, however, where multiple local minima exist, and therefore different starting points may yield different answers. That is to say each such run then yields different contributions for the various elements, which is clearly disconcerting. The MSA, on the other hand, defines a unique logical solution which is obtained in the limit (as sample size grows) by all the different methods in the framework.

MSA and Shapley values come from the field of Game Theory. It is therefore appropriate to introduce the relevant background from the field of Game Theory: A coalitional game with transferable payoff is defined by a pair (N,v), where $N=\{1, \ldots, n\}$ is the set of all players and v(S), for every $S \subseteq N$, is a real number associating a worth with the coalition S, such that $v(\Phi)=0$ (where $\Phi$ stands for the empty coalition). A payoff profile of such a game is the assignment of a payoff for each of the players. A value is a function that assigns a unique payoff profile to every coalitional game with transferable payoff. It is efficient if the sum of the components of the payoff profile assigned is always v(N). That is, an efficient value divides the overall game's worth to the different players.

The marginal importance of player i to any coalition S with $i \notin S$ is $$\Delta_i(S) = v(S \cup \{i\}) - v(S) \quad (3)$$

The Shapley value is defined by the condition $$\gamma_i(N, v) = \frac{1}{n!} \sum_{R \in R} \Delta_i(S_i(R)) \quad (4)$$

for each $i \in N$, where R is the set of all n! orderings of N and $S_i(R)$ is the set of players preceding i in the ordering R. The Shapley value can be interpreted as follows: Suppose that all the players are arranged in some order, all orders being equally likely. Then $\gamma_i(N, v)$ is the expected marginal importance over all orders of player i to the set of players who precede him. The Shapley value is an efficient value since the sum of the marginal importance of all players in any order is v(N). It assumes each player should be given payoff equal to the average importance the player has to coalitions. In the following we consider several alternative ways in which the Shapley value may be formally characterized.

For each coalition S, the subgame $(S, v^s)$ of (N, v) is defined to be the game in which $v^s(T)=v(T)$ for any $T \subseteq S$. A value $\Psi$ satisfies the balanced contributions property if for every coalitional game with transferable payoff (N,v) and for every $i,j \in N$ $$\Psi_i(N,v) - \Psi_i(N\backslash\{j\}, v^{N\backslash\{j\}}) = \Psi_j(N,v) - \Psi_j(N\backslash\{i\}, v^{N\backslash\{i\}}), \quad (5)$$

which states that the change in the value of player i when player j is excluded from the game is equal to the change in the value of player j when player i is excluded. Thus, the property intuitively states that objections made by any player to any other regarding the division are exactly balanced by the counterobjections. The unique efficient value that satisfies the balanced contributions property, an intuitive criteria of fairness, is the Shapley value.

Let player i be a null player in v if $\Delta_i(S)=0$ for every coalition S ($i \notin S$). Players i and j are interchangeable in v if $\Delta_i(S)=\Delta_j(S)$ for every coalition S that contains neither i nor j. Using these basic definitions, one of the axiomatizations of the Shapley value is:

Axiom 1 (Symmetry) If i and j are interchangeable in game v then $\Psi_i(v)=\Psi_j(v)$.

Axiom 2 (Null player property) If i is a dummy player in game v then $\Psi_i(v)=0$.

Axiom 3 (Additivity) For any two games v and $w \Psi_i(v+w)=\Psi_i(v)+\Psi_i(w)$ for all $i \in N$, where v+w is the game defined by $(v+w)(S)=v(S)+w(S)$.

The Shapley value is the only efficient value that satisfies the above three axioms, pointing to its uniqueness.

The Shapley value as a unique fair solution concept has been used in many fields beyond that of theoretic Game Theory. One of its most important applications is cost allocation, where the cost of providing a service has to be shared among the different receivers of that service. Such a use of the Shapley value has received recent attention in the context of sharing the cost of multicast routing. Other fields where the Shapley value is used include politics, international environmental problems and economic theory.

The data set analyzed within the framework of Multi-lesion Shapley value Analysis (MSA), just like the FCA's input, consists of performance measurements of a task over many multi-lesion experiments. In each such experiment, a different lesioning configuration is imposed upon the network, that is to say different combinations of elements are silenced. Let us view the lesion configuration of such an experiment as a coalition S consisting of all intact elements in that configuration. Let us further view the performance measurement in the experiment of that configuration as v(S). This view defines a coalitional game with transferable payoff. Without any further assumptions, the Shapley value of the game is the fair division of the network performance to the different elements. This value denotes the average importance of each element to the task in question and hence it is a natural definition of contribution within the multi-lesion framework. Since $v(\Phi)=0$ doesn't necessary hold in practice, as it is dependent on the performance measurement definition, the Shapley value efficiency is expressed by the property according to which the sum of the contributions assigned to all the elements always equals $v(N)-v(\Phi)$. Furthermore, since no limitations are enforced on the shape of v, a negative contribution is possible, indicating that the element hinders, on the average, the task performance.

In the context of multi-lesion analysis, Axiom 1 above indicates that if two elements always have the same importance to a lesioning configuration, their contributions should be identical. Axiom 2 implies that an element that has no importance when added to any lesioning configuration should be assigned a zero contribution. Axiom 3 indicates that if two separate tasks performed by the network are analyzed in the multi-lesion framework and if the overall performance of the network is equal to the sum of the performances in the two subtasks, in all multi-lesion configurations, then the total contribution assigned to each element should be equal to the sum of its contributions in the two tasks. These axioms apply naturally in the case of multi-lesion analysis. Requiring the division to be fair, we use the Shapley value, the only efficient value satisfying the three axioms, as the elements contributions.

Once a game is defined, its Shapley value is unique, and given the full set of $2^n$ multi-lesion configurations along with the performance measurement for each, the Shapley value may be calculated straightforward using equation (4). The summation in equation (4) runs over all n! orderings of N. Alternatively, the Shapley value can be computed as a summation over all $2^n$ configurations $$\gamma_i(N, v) = \frac{1}{n!} \sum_{S \subseteq N\setminus\{i\}} \Delta_i(S) \cdot |S|! \cdot (n - |S| - 1)! \quad (6)$$

substituting equation (3) in this equation results in $$\gamma_i(N, v) = \frac{1}{n!} \sum_{S \subseteq N\setminus\{i\}} v(S) \cdot (|S|! - 1)! \cdot (n - |S|)! - \quad (7)$$
$$\frac{1}{n!} \sum_{S \subseteq N, i \notin S} v(S) \cdot (|S|)! \cdot (n - |S| - 1)!$$

where each configuration S contributes a summation element to either one of the two sums, depending on whether element i is lesioned or intact in S. Thus, the Shapley value calculation simply consists of going through all multi-lesion configurations and calculating, for each element, the two sums in the above equation.

Obviously, the full set of all multi-lesion configurations, required for the calculation of the Shapley value, is often not available. Indeed even for moderate size networks the complete set is much too large to be manageable. One of the methods suggested in the preferred embodiments is thus to obtain a subset of the results and use the subset to train a predictor. The predictor then mathematically provides a full set of predicted Shapley values. The predictor is preferably capable of predicting the performance measurements of new, unseen multi-lesion configurations. Given such a predictor, the outcomes of all multi-lesion experiments may be extracted and the predicted Shapley value calculated on this data according to equation (7). Since the prediction may be biased, the predicted Shapley value may not equal the real Shapley value.

The functional uncoupling, as opposed to the FCA, see above, between the predictor component and the contributions calculation enables the MSA to use any predictor relevant for the data, without employing constraints such as the monotonicity constraint on $f$ in the FCA. In some of the examples, the FCA itself is used as the predictor within the MSA framework. It is used merely as a 'black box' for calculating the predicted performance outcomes of all multi-lesion configurations, without considering the contributions it yields. In Example 2, however, Projection Pursuit Regression (PPR) is used as the performance predictor component, achieving in this case much better results than the FCA. PPR is discussed in J. H. Friedman and W. Stuetzle. Projection pursuit regression. *J. Amer. Statist. Assoc.*, 76(376):817–823, 1981, the contents of which are hereby incorporated by reference.

To overcome the absence of the full set of multi-lesion experiments, the MSA may also employ sampling. Let $\hat{R}$ be a randomly sampled set of permutations over the n elements (with repetitions). Then, based on equation (4), $$\hat{\gamma}_i(N, v) = \frac{1}{|\hat{R}|} \sum_{R \in \hat{R}} \Delta_i(S_i(R)) \quad (8)$$

is an unbiased estimator for the Shapley value, $\gamma_i(N,v)$. In order to calculate these estimators for every i, for each permutation $a_1, \ldots, a_n$ in $\hat{R}$ the performance measurements $v(\Phi)), v(\{a_1\}), v(\{a_1, a_2\}), \ldots, v(\{a_1, a_2, \ldots, a_{\tilde{n}-1}\}), v(N)$ are needed. It is pointed out that a particular lesioning configuration need be calculated only once although it may appear in different permutations. Thus, the number of new multi-lesion experiments to be performed for each sampled permutation tends to decrease as more and more permutations are sampled. The resulting estimated Shapley value is an efficient value, since the sum of the marginal importance of all elements in any permutation is $v(N)-v(\Phi)$.

An estimator for the standard deviation of the marginal importance of element i is given by $$s_i(N, v) = \sqrt{\frac{1}{|\hat{R}|} \sum_{R \in \hat{R}} \Delta_i(S_i(R)) - \hat{\gamma}_i(N, v))^2} \quad (9)$$

which yields an estimator for the standard deviation of $\hat{\gamma}_i(N,v)$, the Shapley value estimator $$std(\hat{\gamma}_i(N, v)) = \frac{s_i(N, v)}{\sqrt{|\hat{R}|}} \quad (10)$$

Figure 4:
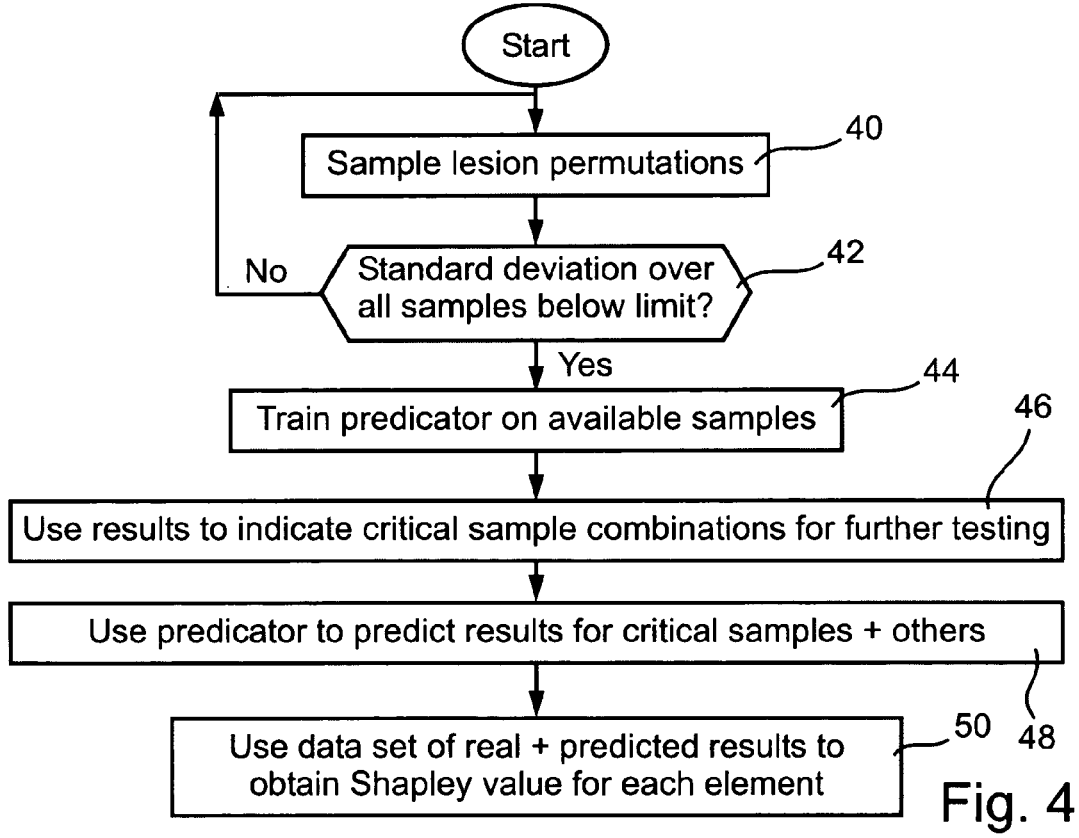
FIG. 4 is a simplified flow chart illustrating a method for analyzing multi-silencing results according to a preferred embodiment of the present invention.

This estimator indicates how close is the sampled Shapley value to the real one. Specifically, using the Shapley value estimator and the standard deviation estimator, confidence intervals for the contribution of each of the elements can be constructed. It is further possible to conduct statistical hypothesis tests, testing whether the contribution of a certain element equals a certain value. Both the confidence intervals and the hypothesis tests are based on the t-distribution. With reference now to the flow chart of FIG. 4, ideally one wishes to sample various permutations at random for constructing the set $\hat{R}$. Such random sampling would continue, in sampling stage 40 for a fixed number of permutations or until a defined stopping condition is reached. One such condition may be a fixed maximal limit for the number of multi-lesion experiments performed. Another condition is to stop the sampling when the standard deviation estimators of all the different contributions are below a desired $\in$. The latter stopping condition is shown in stage 42.

In the ideal sampling method described above, multi-lesioning experiments are performed at random over the sampling space so as to provide the best possible sample results for the predictor. However in practical biology work such random sampling is not typically possible and the sample set is likely to be limited due to experimental limitations. The multi-lesion experiments that are to be performed are dictated by already sampled permutations, and, due to the experimental limitations it is usually not possible to carry out all the permutations required. Rather, a data set consisting of a sample of multi-lesion experiments is often all that is available from stage 40 for the subsequent analysis. In such a case, a predictor is trained on the data, stage 44, and in principle the predicted Shapley value may be calculated directly from the predictor. The prediction operation typically requires $O(n \cdot 2^n)$ computations for n elements. When n is large the prediction is too computationally expensive, and, instead, sampling is used. That is, the performance predictor serves as an oracle in stage 48 supplying performance predictions for any lesion configuration based on the sampled permutations in stage 46, resulting in an estimated predicted Shapley value, in stage 50. The sampling method therefore does not merely relieve the MSA framework of the need for the full set of $2^n$ multi-lesion experiments. The sampling method also relieves the framework from the $O(n \cdot 2^n)$ computations needed to evaluate the real Shapley value or the predicted Shapley value, whilst at the same time quantifying the accuracy of the contributions obtained with a specific sample.

Reference is now made to FIG. 5, which is a simplified flow chart showing how MSA provides a scalable method for handling networks with a large number of elements. A two-phase MSA procedure is motivated by the observation that often only a small fraction of the possibly large number of elements significantly contributes to the specific task tested in any given analysis. A first phase hence finds those elements with significant contributions. This phase uses a small sample, stage 60, in order to calculate the estimated Shapley value and the standard deviation estimator, stage 62. A two-sided t-test is then performed on the contribution of each element (where the null hypothesis indicates that the contribution is zero) identifying the significant elements, and eliminating the insignificant elements in stage 64.

A second phase then focuses on finding the accurate contributions of the significant elements as determined in the previous phase. The second phase may use the same small sample from the first phase, or if practical, new data may be obtained, but analysis stage 66 focuses on the coalitional game (N',vN'), where N' is the set of elements found as significant in the first phase, and vN' is defined such that for $S \subseteq N'$, vN'(S) equals the average of v(T) over all T satisfying $T \cap N' = S$, where v is the characteristic function of the original game consisting of all elements. Thus, using the original sample, some of the vN' are based on an average over many multi-lesion experiments, while others might not be evaluated due to lack of data. In the case where the characteristic function vN' cannot be fully calculated, a predictor is trained using the available data as explained above. The predictor is trained on multi-lesion configurations of size |N'| rather than of size |N|, thereby allowing for faster training without imposing a scalability challenge. In the case where the number of significant elements is too large for the explicit calculation of the predicted Shapley value, sampling is incorporated of the kind explained above with reference to FIG. 4, in this second phase, using the much smaller configurations space. Thus, in stage 68, either a predicted Shapley value or an estimated predicted Shapley value is calculated as before.

When the two-phase procedure is used for localizing several tasks in a large network, i.e., when a multi-lesion experiment measures several performance values, the two-phase procedure is applied for each and every task separately, as the set of significant elements yielded by the first phase is liable to be different depending on the individual task currently being analyzed. That is to say there is usually no reason to suppose that for two different tasks, the set of significant elements will be the same.

Test Case of Simple System

In the following section we analyze a simple system as a test case for the MSA. After introducing the system, we present the Shapley value obtained and its correctness in this case. We then compare the MSA with both single lesion analysis and the FCA in this test case.

The System

Let us define a system of elements $\{e1, \ldots, en\}$, where the lifetime of element ei is exponentially distributed with parameter $\lambda i$ (expected value of $1/\lambda i$), and such that the elements are independent. We define the performance of the system as the expected time when at least one of the elements is still functioning. That is, as the expectation of the maximum of the individual lifetimes. For simplicity, we focus on the case n=3, but the results presented throughout this section hold for any number of elements.

We calculate the performance for each of a series of perturbation configurations imposed upon the system. In each case a "perturbed" element is removed from the system. Obviously, $v(\Phi)=0$ and $v(\{ei\})=1/\lambda i$, for $i \in \{1, 2, 3\}$, since there is only one element in the system in the latter and none in the former. For $i \neq j$, $i,j \in \{1, 2, 3\}$, $v(\{ei,ej\})$ is the expectation of a random variable with a cumulative distribution function which is the product of the two cumulative distribution functions: $(\tilde{1}-e^{-\lambda_i x}) \cdot (\tilde{1}-e^{-\lambda_j x})$. Calculating the expectation using the cumulative distribution function yields $$v(\{e_i e_j\}) = \frac{1}{\lambda_i} + \frac{1}{\lambda_j} - \frac{1}{\lambda_i + \lambda_j}. \tag{9}$$

Similarly, $$v(\{e_1, e_2, e_3\}) = \frac{1}{\lambda_1} + \frac{1}{\lambda_2} + \frac{1}{\lambda_3} - \frac{1}{\lambda_1 + \lambda_2} - \frac{1}{\lambda_1 + \lambda_3} - \frac{1}{\lambda_2 + \lambda_3} + \frac{1}{\lambda_1 + \lambda_2 + \lambda_3} \tag{10}$$

is the performance of the system in its intact state.

The formulas of v may also be viewed intuitively based on the inclusion-exclusion formula. For instance, equation (10) is illustrated as shown in FIG. 6 using Venn diagrams.

FIG. 6 comprises a series of Venn diagrams, in which each Venn diagram corresponds to a term in equation (10), in the same order. A region in a Venn diagram in the illustration is the expected time where all the elements corresponding to included groups are functioning. Thus, an intersection of several groups yields the expectation of the minimum of the corresponding lifetimes. In this case of exponential distributions, the minimum is also exponentially distributed with a parameter equal to the sum of the parameters of the intervening distributions. Thus, the resulting expectation of each such distribution as shown in equation (10).

Knowing the performance of each coalition of elements, the Shapley value (i.e., contributions) is obtained using equation (5). The contribution of element $e_1$ is $$\gamma_1(N, v) = \frac{1}{\lambda_1} - \frac{1}{2} \cdot \frac{1}{\lambda_1 + \lambda_2} - \frac{1}{2} \cdot \frac{1}{\lambda_1 + \lambda_2} + \frac{1}{3} \cdot \frac{1}{\lambda_1 + \lambda_2 + \lambda_3}, \quad (11)$$

and similarly for the other elements. Illustrating the meaning of the resulting contribution of $e_1$ using Venn diagrams, we obtain FIG. 7, which is presented in the same order as the terms in equation (11). As seen from the left-hand side Venn diagram, element $e_1$ is accredited for a third of the time when functioning with both elements $e_2$ and $e_3$ together, in which case the rest is divided equally between the contributions of elements $e_2$ and $e_3$. The element $e_1$ is also credited for half of the time when it functions with either $e_2$ or $e_3$ in which case the other half is attributed to the other element, and $e_1$ is fully accredited for the whole time when it functions alone. That is, the Shapley value divides the intact performance of the system (equation 10) to the different elements such that each term is divided equally to all elements composing it, denoting a fair division of the system performance to the different elements.

COUNTER EXAMPLE

The Test Case Using Prior Art Single Lesion Analysis

The single lesion approach consists of perturbing one element within each experiment and measuring the decrease in performance. Using the same notation as the MSA, the contribution assigned to element i using single lesion analysis is proportional to $v(N)-v(N\setminus\{e_i\})$. For the test case system, this equals (for i=1)

$$\sigma_1(N, v) = \frac{1}{\lambda_1} - \frac{1}{\lambda_1 + \lambda_2} - \frac{1}{\lambda_1 + \lambda_3} + \frac{1}{\lambda_1 + \lambda_2 + \lambda_3}, \quad (12)$$

and similarly for the other elements. Reference is now made to FIG. 8 which Illustrates $\sigma_1$ using Venn diagrams. FIG. 8 shows the contributions in the same order as the terms in equation (12). The left-hand side. Venn diagram shows that with single lesion analysis, each element is only accredited for the expected time when it is functioning alone, without considering its previous contribution while other elements were still functioning. Thus, the Shapley value is much more informative in capturing the true contribution of the elements in comparison with using only single perturbation experiments.

The significant difference in the contributions obtained using the Shapley value versus the single lesion contributions is further demonstrated using a concrete example of the test case, where n=4 and $\lambda_i$=1/i, for i=1, . . . ,4. Reference is now made to FIG. 8, which is a graph comparing the Shapley value—black bars, with the single lesion contributions—shown as shaded bars. As discussed below the same experiment was run using FCA and the FCA results are shown as white bars. The results are normalized, as are all following results except where explicitly stated otherwise, such that the sum of contributions of all elements equals 1. More specifically, for each of the four elements, the Shapley value, the single lesion contributions and the FCA contributions within each of the 10 runs are normalized such that their sum equals 1.

Both the Shapley value and the FCA are based on all of the $2^4$ permutations of the four elements, and it is clear that there are significant differences between the three methods in assigning utility to elements 1, 2 and 4, although there is agreement with element 3. Obviously, even in this very simple system, there is a non-negligible difference between the different methods.

COUNTER EXAMPLE 2

Prior Art FCA of the Test Case

Figure 9:
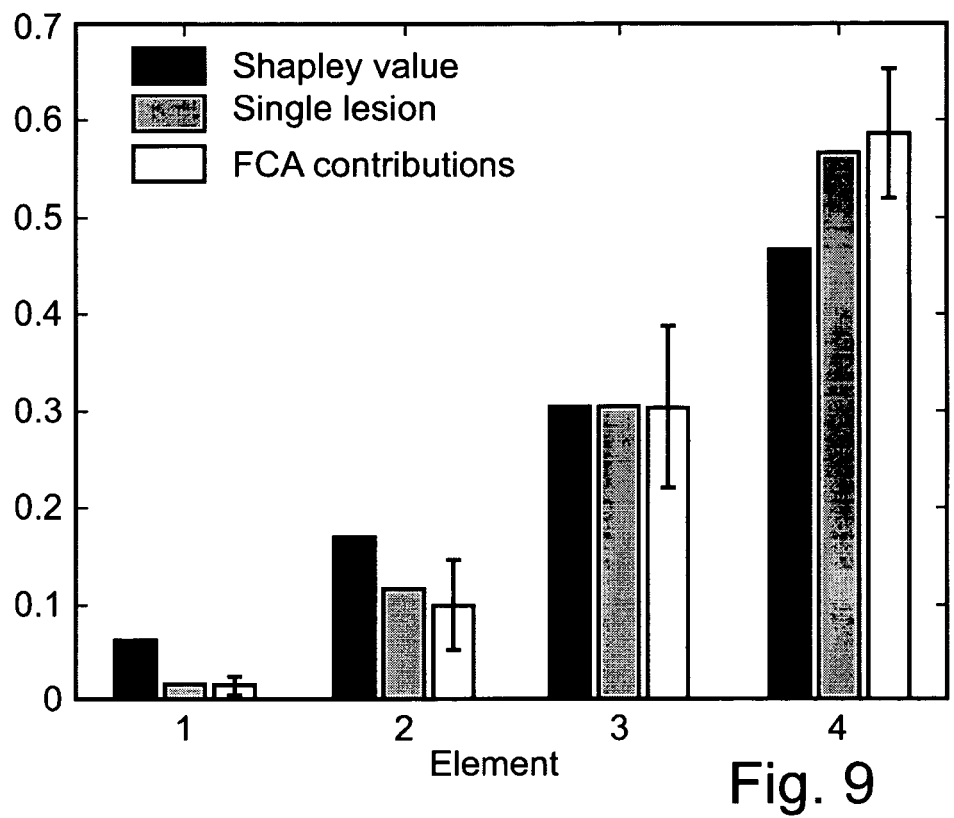
FIGS. 9, 10 and 11 illustrate an experimental example carried out on a first agent on a neural network.

In order to use the FCA for analyzing the test case, a concrete example must be considered, since no general formulas for the contributions exist, by contrast with the case of single lesion analysis and the MSA. We analyze the same concrete example of the test case introduced above. The FCA is trained 10 times using the full set of 24 perturbation configurations, with all runs reaching a zero mean squared error (MSE). As evident from FIG. 9, the FCA contributions and the Shapley value differ significantly for 3 out of the 4 elements, even when considering the large standard deviations of the former. The FCA contributions resemble the contributions assigned by the single lesion analysis, testifying that the FCA fails, too, in capturing a fair attribution of contributions in this case.

The present embodiments will now be illustrated through examples describing the application of MSA, FCA and Single Lesion Analysis to different types of complex system, two being virtual systems and the remainder being biological. It will be appreciated that the complex systems used in the examples are for illustrative purposes only and are not intended to imply that the embodiments are more or less applicable to these complex systems as opposed to any others.

1) Neural Networks Experiment.

An Evolved Autonomous Agent (EAA) is a software program embedded in a simulated virtual environment, performing typical animal tasks like gathering food, navigating, evading predators and seeking prey and mating partners. An EAA is controlled by an artificial neural network "brain". This neurocontroller receives and processes sensory inputs from the surrounding environment and governs the agent's behavior via the activation of motors controlling its actions.

More particularly, an Evolved Autonomous Agent (EAA) is a software program embedded in a simulated virtual environment, performing typical animal tasks like gathering food, navigating, evading predators and seeking prey and mating partners. An EAA is controlled by an artificial neural network "brain". This neurocontroller receives and processes sensory inputs from the surrounding environment and governs the agent's behavior via the activation of motors controlling its actions. In recent years, much progress has been made in finding ways to evolve EAAs which successfully cope with diverse behavioral tasks, employing networks composed of several dozen neurons and hundreds of synapses.

The MSA was mainly developed and studied on the neurocontrollers of EAAs described below. Following a description of the neurocontrollers we present full information MSA analyses of neurocontrollers, comparing the results with those of the FCA. After that we further present analyses using the predicted Shapley value, the estimated Shapley value and the estimated predicted one. We also demonstrate the two-phase MSA procedure. The example is concluded with an experiment of a pruning method based on the contributions yielded by the MSA, testifying to their superiority versus the FCA in capturing the real values of synapses to the agent's performance.

A brief overview of the EAA environment used to study and develop the MSA is provided herewith. The EAAs analyzed here live in a virtual discrete 2D grid "world" surrounded by walls. Poison items are scattered all around the world, while food items are scattered only in a "food zone" in one corner. The agent's goal is to find and eat as many food items as possible during its life, while avoiding the poison items. The performance score of the agent is proportional to the number of food items minus the number of poison items it consumes. The agent is equipped with a set of sensors, motors, and a fully recurrent neurocontroller, which is evolved using a genetic algorithm.

Figure 10:
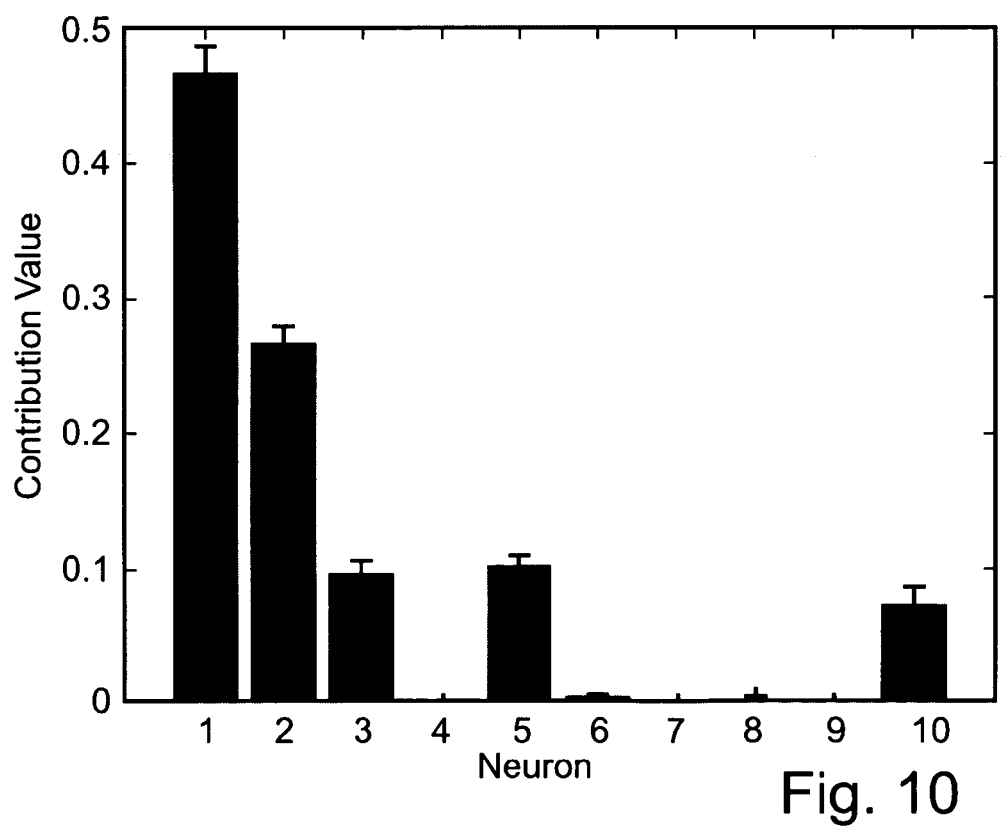

In an EAA study we evolved neurally controlled autonomous agents capable of successful navigation and foraging behavior in a virtual, simulated arena. The agents are controlled by a fully recurrent neural network that receives inputs from the agent's sensors and drives its behavior via activation of its motors. The agents' networks were not engineered by us, but rather, emerged through the evolutionary process. Hence, we did not have any previous knowledge of their structure and dynamics, and no understanding of their workings. To obtain such an understanding, we employed a multi-silencing analysis to the neurocontroller of one such successful agent. This was performed by running the agent in its environment for many trials. In each trial, another subset of the agents neuron's was silenced, and the agent's performance (measured by the net number of food items he managed to consume) following the lesion was recorded. The consequent dataset of hundreds of such multi-silencing trials was then analyzed by the MSA algorithm. The resulting contribution values where then calculated in accordance with the present embodiments. The calculated contributions of neurons 1–10 are portrayed in FIG. 10. It is clear that the MSA analysis reveals that only six of the neurons are really important for the agent's functioning. It also correctly identifies the central but delicate role played by neuron number 5, which is an internal "command" neuron that modulates the general mode of behavior of the agent.

Figure 11:
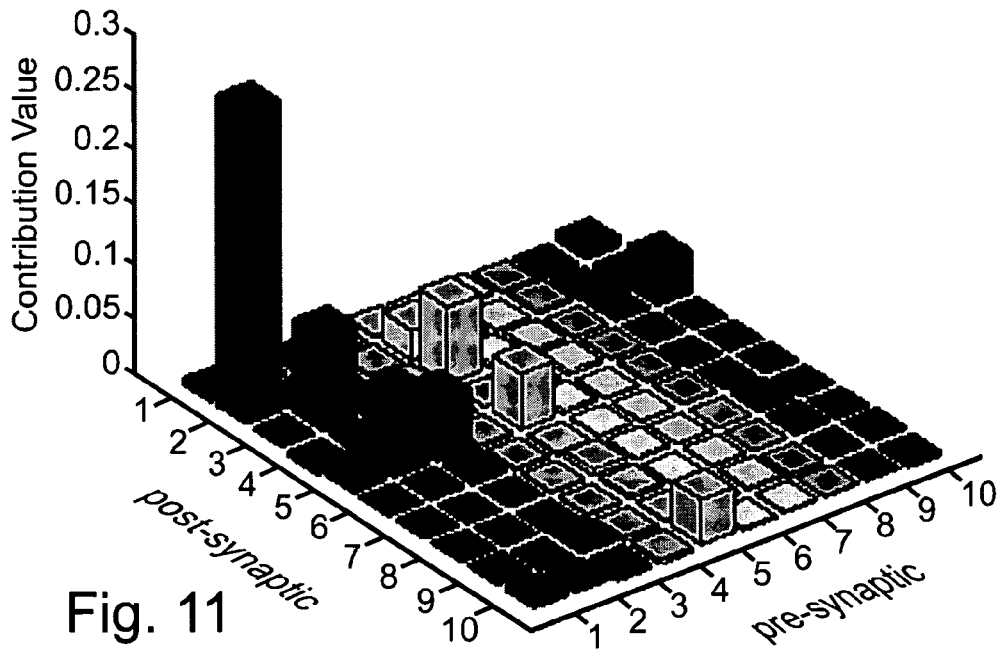

The MSA can be applied at different levels of the system and is not inherently confined to one level. FIG. 11 shows the resulting synaptic contributions obtained by MSA; the multi-silencing data needed for the analysis was gathered in a manner similar to the one described above for the neuronal case, except that in the latter case a different configuration of synapses were lesioned (instead of neurons). The MSA successfully delineates the few functionally important synapses out of the multitude of functionally insignificant ones.

Figure 12:
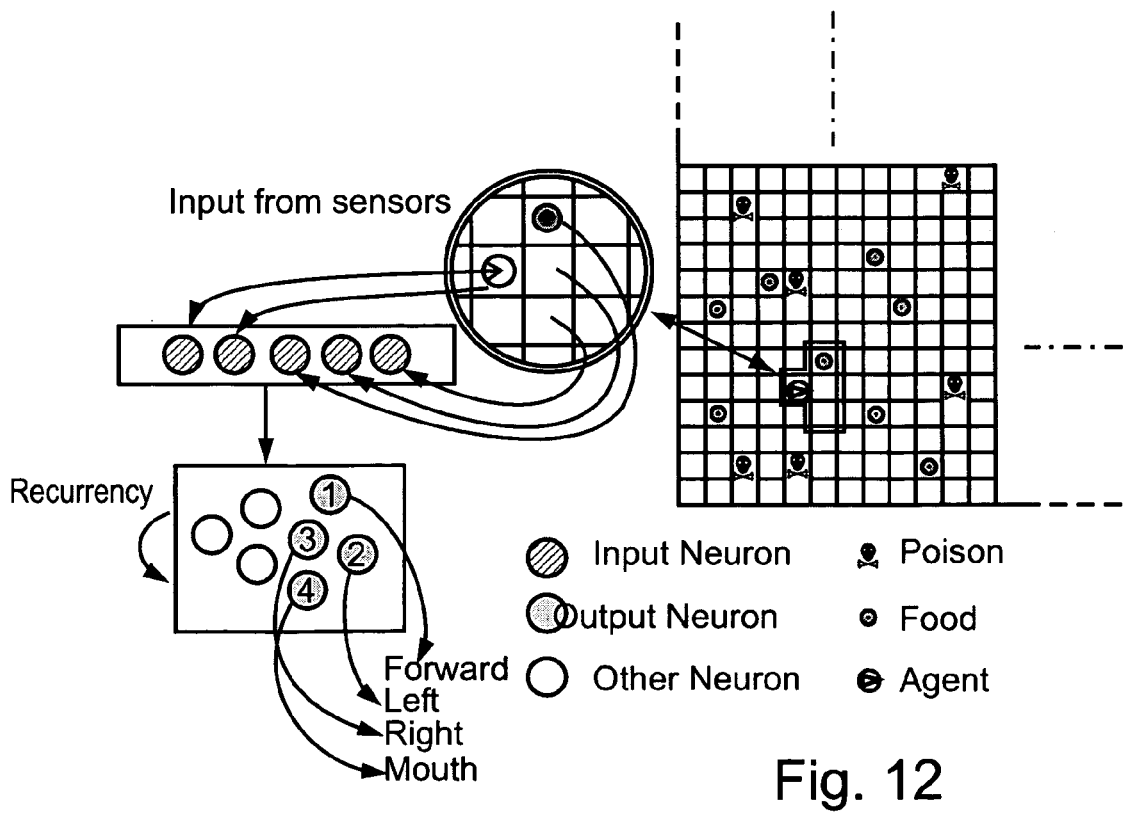
FIG. 12 illustrates a neural network environment the neural network experimental example.

In the following, results are given for other agents, but first of all reference is made to FIG. 12, which is a schematic diagram illustrating the EAA environment, more specifically of the grid world and the agent's neurocontroller. The agent is marked by a small arrow on the grid, whose direction indicates its orientation. The curved lines indicate where in the arena each of the sensory inputs comes from. Four sensors at the agent encode the presence of a wall, a resource (food or poison, without distinction between the two), or a vacancy in the cell the agent occupies and in the three cells directly in front of it. A fifth sensor is a "smell" sensor which can differentiate between food and poison underneath the agent, but gives a random reading if the agent is in an empty cell. The four motor neurons dictate movement forward (neuron 1), a turn left (neuron 2) or right (neuron 3), and control the state of the mouth (open or closed, neuron 4). In each step a sensory reading occurs, network activity is then synchronously updated, and a motor action is taken according to the resulting activity in the motor neurons.

Previous analysis Aharonov-Barki, Beker, RuppinAharonov-Barki et al. 2001, the contents of which are hereby incorporated by reference, revealed that successful agents possess one or more command neurons that determine the agent's behavioral strategy. Artificially clamping these command neurons to either constant firing activity or to complete quiescence causes the agent to constantly maintain one of the two behavioral modes it exhibits, regardless of its sensory input. These two behavioral modes are exploration and grazing. Exploration, which takes place when the agent is outside of the food zone, consists of moving in straight lines, ignoring resources in the sensory field that are not directly under the agent, and turning at walls. Grazing, which takes place when the agent is in the food zone, consists of turning towards resources to examine them, turning at walls and maintaining the agent's location on the grid in a relatively small region centered at the food zone.

We now focus on the analysis of three agents, S10, P10 and W10, which have been successfully evolved in this environment. All three agents are equipped with a fully recurrent neurocontroller consisting of 10 internal neurons, including the motors (not including the sensors), out of which one is the command neuron that determines the behavioral mode. The neurocontroller of S10 [Aharonov-Barki, Beker, RuppinAharonov-Barki et al. 2001] is composed of binary McCulloch-Pitts neurons, whose synaptic strengths were evolved. This agent has been previously analyzed using the FCA [Aharonov, Segev Meilijson, RuppinAharonov et al. 2003, Segev, Aharonov, Meilijson, RuppinSegev et al. 2003]. P10 was obtained by a process in which, after the evolution of a successful agent, its synapses were pruned using an evolutionary network minimization algorithm [Ganon, Keinan, RuppinGanon et al. 2003] that deletes unimportant synapses and modifies the weights of the remaining ones so as to best maximize the performance of the agent. Like S10, P10 is equipped with a neurocontroller composed of binary McCulloch-Pitts neurons; but only 14 recurrent synapses out of the 100 original ones are left after applying the minimization algorithm. W10 copes with a more difficult delayed response task [Saggie, Keinan, RuppinSaggie et al. 2003], according to which the agent has to wait and remain still in a grid cell containing food for 5 steps without moving or turning in order to eat. Eating takes place only if the agent closes its mouth in the last waiting step. The sensors and motors of W10 are identical to those of S10 and P10, as well as the performance measure, but the neurocontroller of W10 is composed of spiking Integrate-And-Fire neurons, whose membrane time-constants were evolved, as well as the synaptic strengths.

We first measure the performance score of agent P10 under the entire set of $2^{14}$ synaptic perturbation configurations, where each synaptic perturbation configuration indicates for each of the 14 recurrent synapses in the network whether it is perturbed or left intact. The perturbation method used is stochastic lesioning [Aharonov, Segev, Meiliison, RuppinAharonov et al.2003], which is performed by randomizing the firing pattern of a perturbed element, while keeping the firing probability equal to its intact overall mean firing rate.

Figure 13:
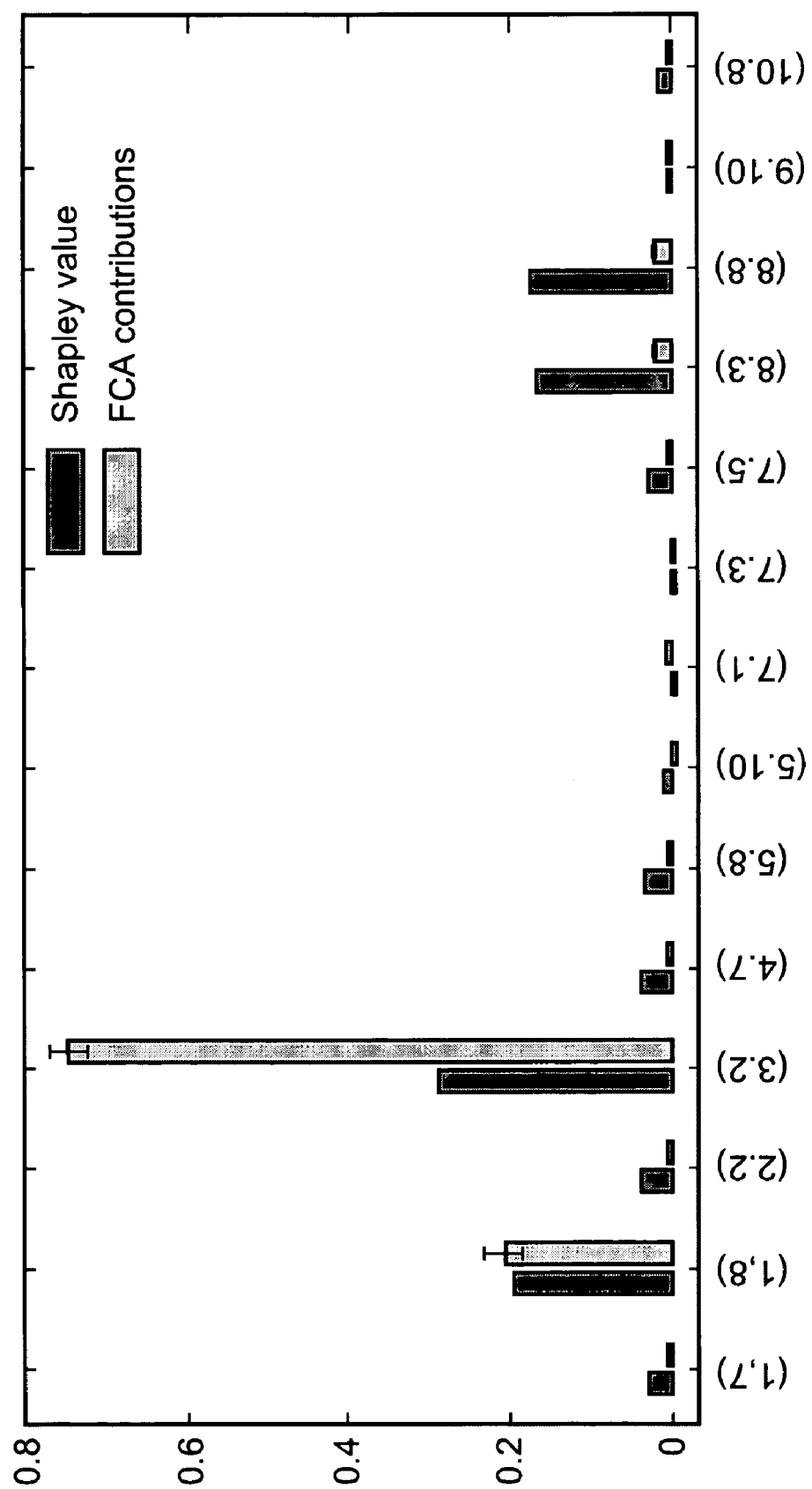
FIGS. 13 to 18 are graphs showing results obtained with other agents in the same neural network example.

Reference is now made to FIG. 13, which plots the actual Shapley value, calculated in a straight forward manner using the full information. An actual Shapley value is relatively easy to compute on a virtual system such as this since the system is fully digitally characterized. The four most important synapses are, by order of importance, the synapse from the right motor to the left one, from the forward motor to the command neuron (neuron number 8), the recurrent synapse from the command neuron to itself and the synapse from the command neuron to the right motor. The rest of the synapses exhibit minor contributions, and two synapses ((7,1) and (7,3)) have negative contributions, testifying to the fact that, on the average, they hinder the performance. FIG. 13 also presents in light shading the FCA contributions yielded when training the FCA 10 times with the training set consisting of all $2^{14}$ configurations. Only for 2 out of the 14 synapses, is the contribution defined by the Shapley value, capturing the fair division of the contributions, within one standard deviation of the corresponding FCA contribution. In FIG. 13, the axes present the synapses in the form (presynaptic neuron, postsynaptic neuron).

Figure 14:
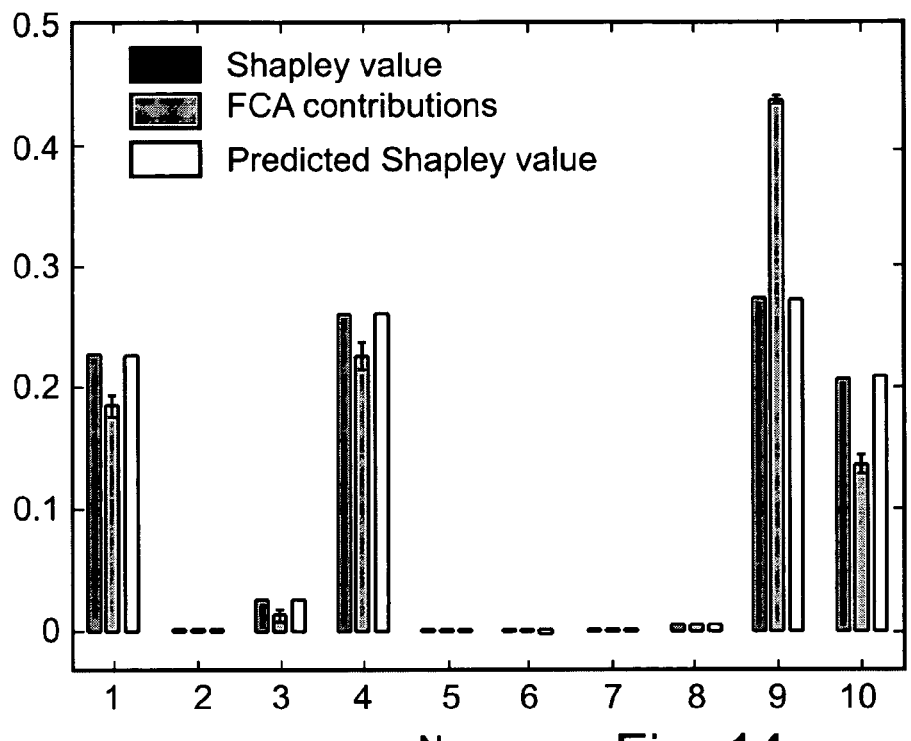

For W10, the performance score was measured under the entire set of $2^{10}$ neuronal perturbation configurations, using stochastic lesioning. Reference is now made to FIG. 14 which displays the Shapley value based on the full information available. Previous analysis [Saggie, Keinan, RuppinSaggie et al. 2003] revealed neuron number 10 to be the command neuron, neurons number 4 and number 9 to participate in the temporal "counting" required for the precise timing of food consumption, and neuron number 1, the forward motor, to count the last two steps before moving forward. The MSA accurately reveals those neurons to be the most significant ones. FIG. 14 also displays the pertaining FCA contributions calculated using all possible perturbation configurations, obtaining an average train MSE corresponding to explaining more than 99.99% of the variance. Nevertheless, the Shapley value and the FCA contributions differ significantly, with the Shapley value of only one neuron (number 8) being within one standard deviation of its FCA contribution.

In addition to the difference between the FCA contributions and the Shapley value, the latter also outperforms the FCA computationally. Calculating the Shapley value requires n computations for each perturbation configuration, while the FCA performs many more computations for each configuration, where this number is dependent upon the number of iterations, the number of gradient descent iterations within each iteration and the performance of the isotonic regression. In FIG. 14, the Shapley value, FCA contributions and predicted Shapley value of the neurons of W10 are shown. The Shapley value (black bars) is plotted along with FCA contributions (dark gray bars; mean and standard deviation across 10 FCA runs) and with the predicted Shapley value based on the prediction of the FCA (light gray bars; mean and standard deviation across the 10 FCA runs).

Using the FCA as a predictor, a predicted Shapley value is calculated. As evident in FIG. 14, although the FCA contributions differ significantly from the real Shapley value, the predicted Shapley value achieved using FCA is very close to the real Shapley value. More particularly, the distance between the Shapley value vector and the mean FCA contribution vector is 0.1888, while the distance between the former and the mean predicted Shapley value vector is 0.0019.

To test the accuracy of the predicted Shapley value when using a small training set, the FCA was trained to be used as a predictor with a training set of randomly chosen configurations of P10 of size 100,200, . . . ,1000. Reference is now made to FIG. 14 which plots the contribution of the most important synapse of P10 as yielded by the predicted Shapley value, along with the real Shapley value, as a function of the number of configurations in the training set. The predicted Shapley value is strikingly close to the real one, even for very small numbers of perturbation configurations used for training, and exhibits stability across the different runs, as noted by the small standard deviations. Remarkably, this is true even though the prediction is not very accurate. More particularly the average test MSE corresponds to explaining less than 60% of the variance when 100 perturbation configurations are used for training. However, as is clear from the figure, the prediction improves as the training set size increases.

Figure 15:
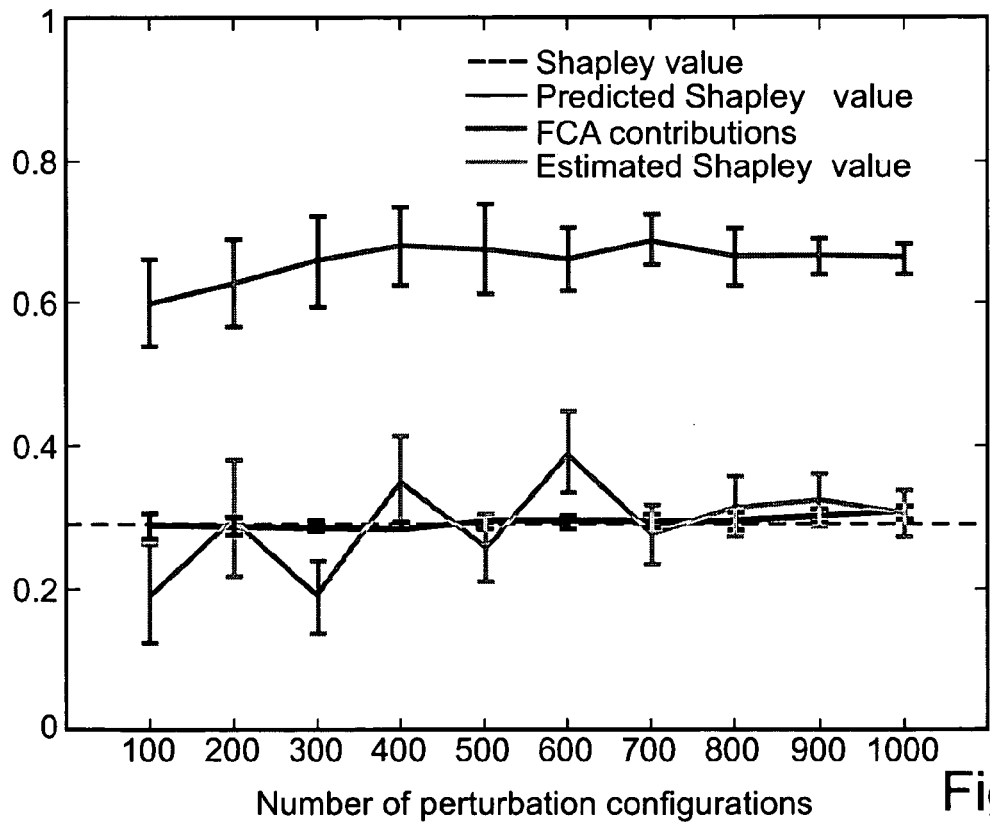

As evident, the FCA contribution differs significantly from the Shapley value and exhibits a large standard deviation across different runs, much larger than that of the predicted Shapley value contribution. This testifies to the fact that the FCA reaches different solutions in term of contributions, which are almost equivalent in their predictive power as captured by the predicted Shapley value yielded from the FCA. Thus, FCA may compete with PPR as an accessory predictor for Shapley value estimation, but does not compete with Shapley value in determining contributions. In FIG. 15, the values for the most important synapse of P10 are plotted against the number of perturbation configurations (100,200, . . . ,1000). The black line plots the mean and standard deviation of the predicted Shapley value, based on 10 different FCA's predictions. The dark gray line plots the mean and standard deviation of the FCA contribution across the 10 runs. The light gray line plots the estimated Shapley value and the standard deviation estimates (as the error bars). The dashed black line denotes the full information Shapley value.

Estimated and Estimated Predicted Shapley Values

It is possible to calculate the estimated Shapley value $\hat{\gamma}_i(N,v)$ by sampling permutations until a maximal predefined limit on the number of configurations used is reached, as explained above. FIG. 15 plots the estimated Shapley value, along with its standard deviation estimate, for the most important synapse of P10, with 100,200, . . . , 1000 as the number of configurations used. As expected from the general theory introduced in section hereinabove, the estimated Shapley value is an unbiased estimator for the real Shapley value and its standard deviation generally decreases with the sample size. It is noted that the standard deviation of the estimated Shapley value is much larger than that of the predicted Shapley value.

Figure 16:
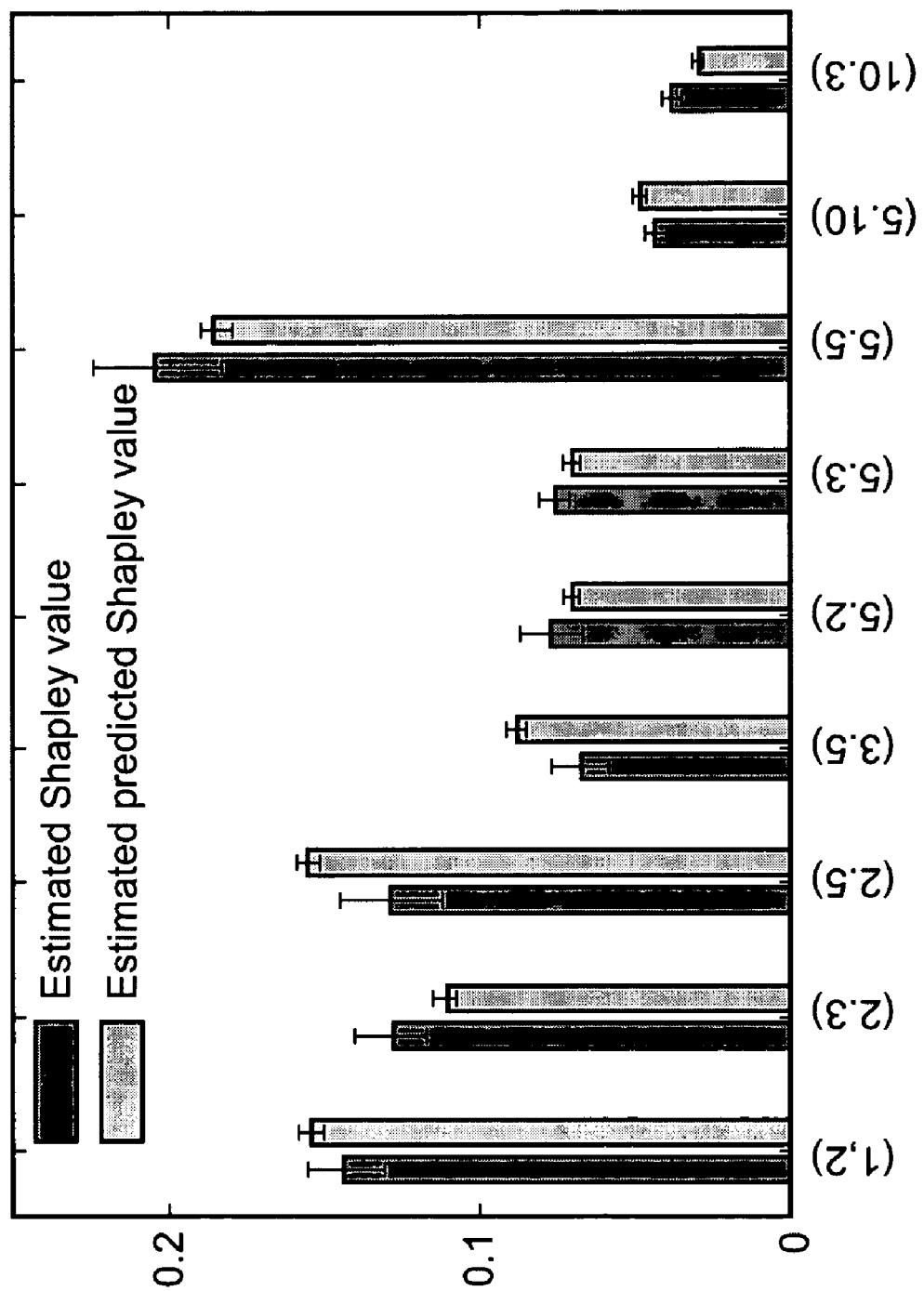

Calculating the entire set of $2^n$ predictions needed for extracting the predicted Shapley value is computationally intractable even for moderate size networks. In such cases, an estimated predicted Shapley value can be calculated by sampling configurations from a predictor. We turn to examine such a case—the analysis of the full recurrent synaptic network of S10, consisting of 100 synapses: An estimated Shapley value is calculated based on a sample of 100 permutations (9833 perturbation configurations), where a more minute perturbation method is employed in order to capture the long-term contributions (ILM, lesioning level of 0.5 [Keinan, Meilijson, RupinKeinan et al. 2003]. Using the FCA as a predictor trained using the same sample, the estimated predicted Shapley value is computed using sequential sampling, stopping when the standard deviation estimates of all 100 predicted contributions are below 0.005. Defining an important synapse as one with a contribution above 0.03, the same nine synapses are yielded as important by both the estimated Shapley value and the estimated predicted one, as shown in FIG. 16, with very similar contributions. FIG. 16 plots estimated Shapley values against estimated predicted Shapley values and shows that there is a difference between them but that the difference is relatively small. Error bars are provided for both estimated and estimated predicted values and denote the standard deviation within the estimates.

By finding the important synapses, the MSA in effect reveals the recurrent backbone of the neural network, containing, in this case, only 9 out of the 100 synapses. Focusing on the backbone may simplify the further analysis of such fully recurrent networks [Aharonov, Segev, Meilijson, RuppinAharonov et al. 2003].

A Two-Phase Procedure for Large Scale MSA

In the following we examine the two-phase procedure for large scale analysis, designed for analyzing large networks as was discussed above. We begin with a moderate size network in order to allow for the comparison of the results of the two-phase procedure with the real Shapley value. Such a moderate size network is obtained by focusing on part of S10's synaptic network analyzed hereinabove as part of the present second neural network example. S10's synaptic network consists of 14 synapses out of the 100, that is, the remaining 86 synapses are always perturbed. The first phase uses a small random sample of 20 permutations (227 perturbation configurations out of the $2^{14}$) to estimate the Shapley value and the standard deviations, and involves performing two sided t-tests with $\alpha=0.05$. The result of the first phase is the successful identification of 11 significant synapses.

Figure 17:
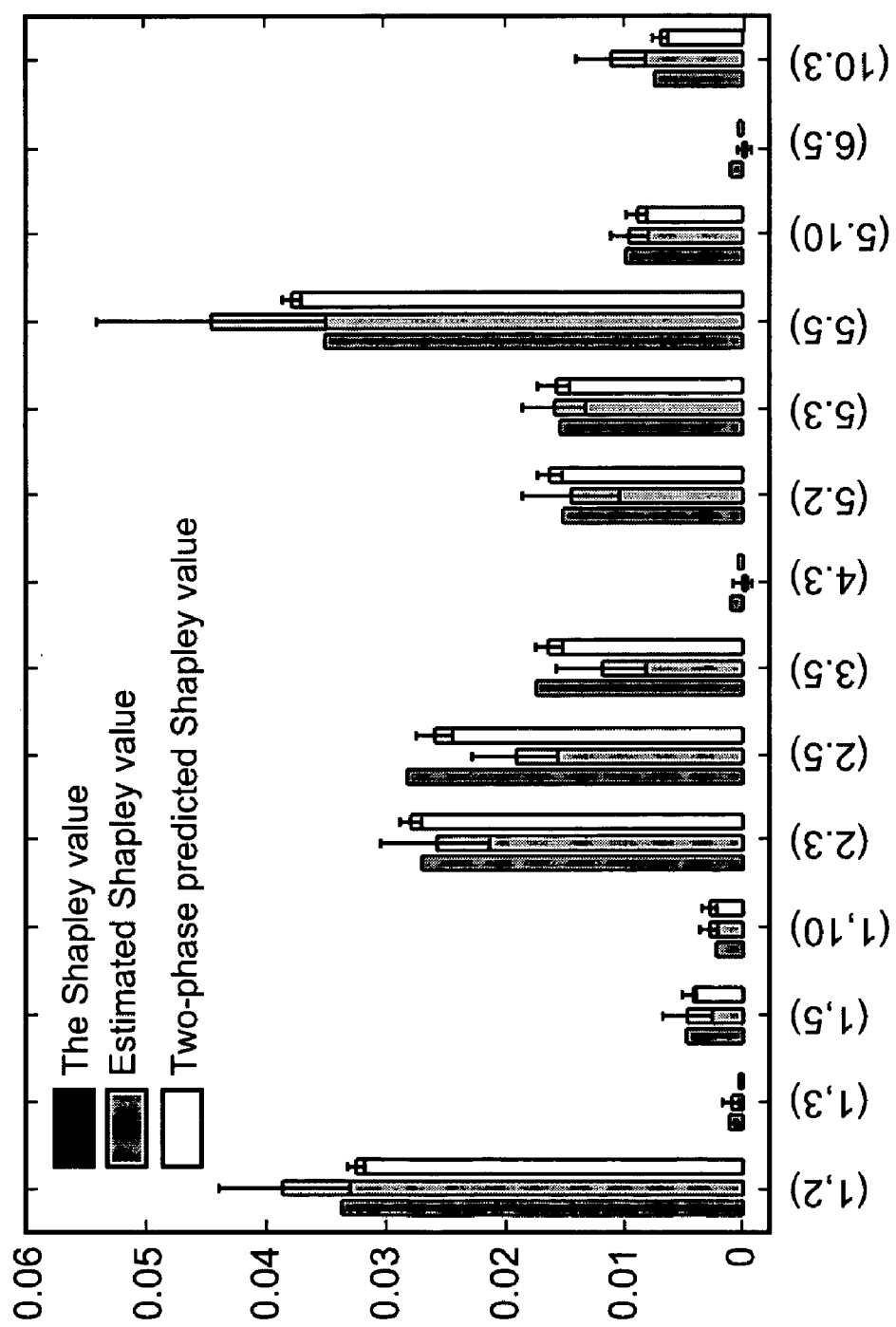

The second phase focuses on the 11 significant synapses identified in the first phase, based on the same sample of 227 configurations. In this second phase an FCA predictor is trained on the sample, and a two-phase predicted Shapley value is calculated using predictions for the full set of $2^{11}$ configurations produced by the FCA. Reference is now made to FIG. 17 which presents the results of this analysis. The figure shows the Shapley values, estimated Shapley value and two-phase predicted Shapley value for the 14 synapses network. Synapses found as insignificant in the first phase ((1,3), (4,3) and (6,5)) are assigned a two-phase predicted contribution of zero. In order for the different values to be comparable, they are not normalized, but rather the sum of the Shapley value and the sum of the estimated Shapley value equal $v(\tilde{N})-v(\Phi)$, where N is the group of all 14 synapses, and the sum of the two-phase predicted ones equals $v^{N'}(\tilde{N'})-v^{N'}(\Phi)$, where N' is the group of the 11 significant synapses.

First, the three synapses with near-vanishing contributions according to the real Shapley value are the ones found as insignificant in the first phase of the procedure. Second, the two-phase predicted Shapley value is much closer to the real value than the estimated Shapley value, and with a much smaller standard deviation.

Figure 18:
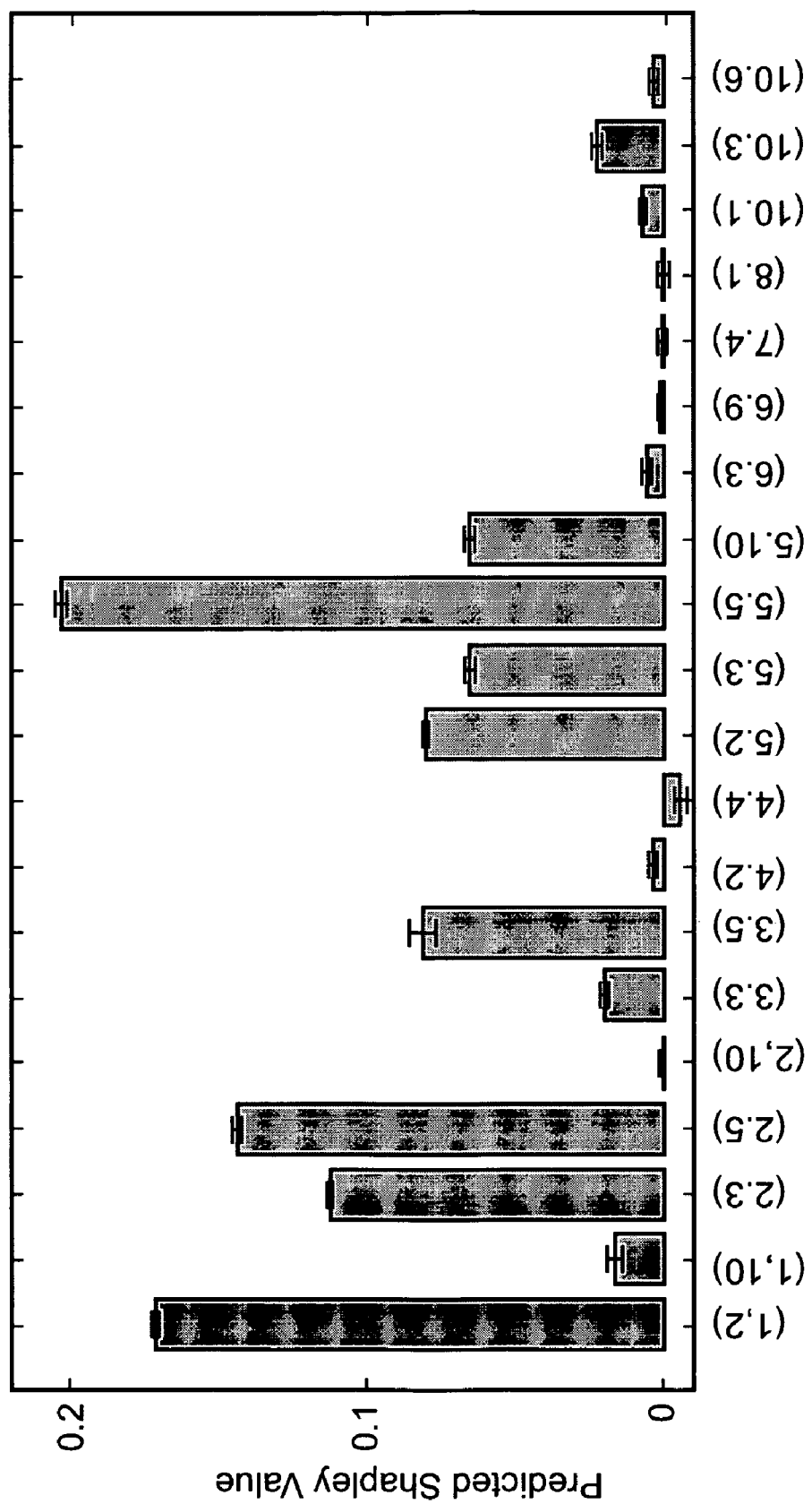

To examine the two-phase MSA procedure on a larger scale, we turn to analyze the full recurrent synaptic network, consisting of all 100 synapses. The first phase, using a very small random sample consisting of 10 permutations, identifies 20 synapses as significant (two-sided t-tests, $\alpha=0.05$). An FCA predictor is trained on the set induced by the sample and a two-phase predicted Shapley value is calculated from the predictions for the full set of $2^{20}$ synaptic perturbation configurations. The mean normalized train MSE corresponds to explaining more than 99.8% of the variance, five times more accurate than when training on configurations of all 100 synapses. Reference is now made to FIG. 18, which displays the two-phase predicted Shapley value for the 20 significant synapses. The graph shows the small standard deviations of the contributions, testifying to their consistency. In this two-phase procedure, the nine synapses with the largest contributions are the same ones found using the single-phase MSA methods.

Synaptic Pruning: MSA vs. FCA

Figure 19:
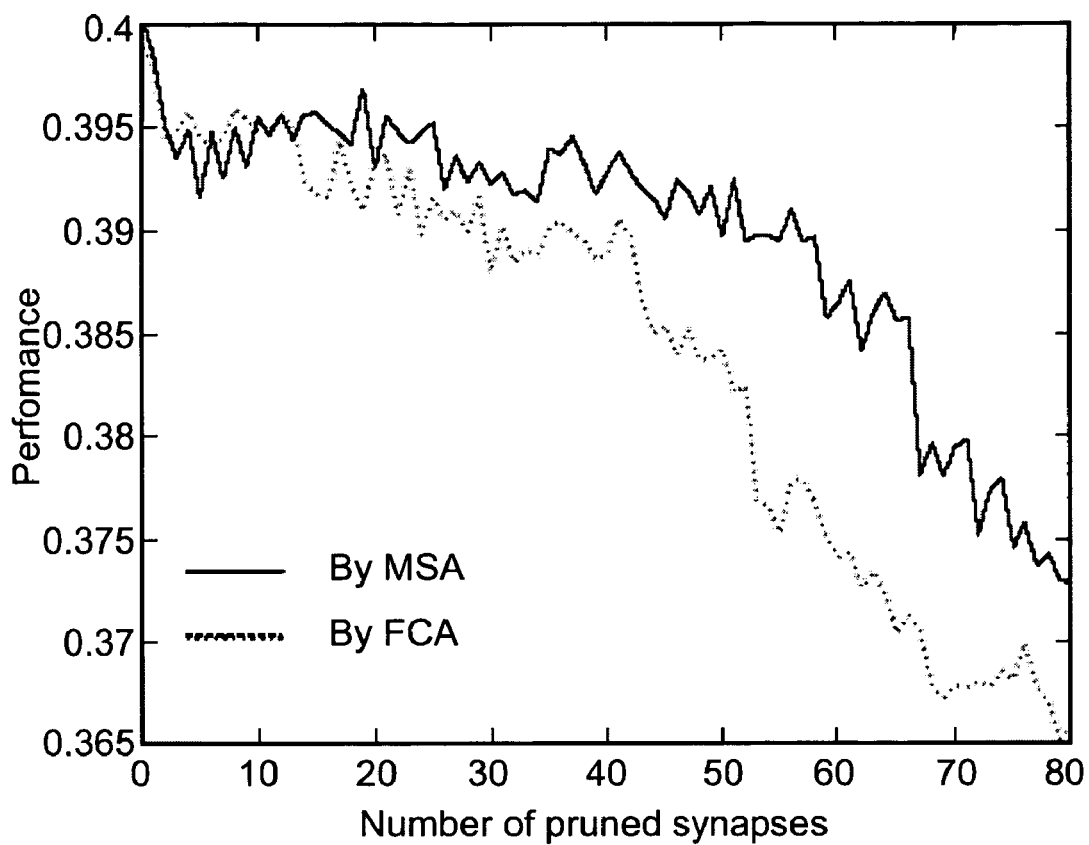
FIG. 19 is a graph illustrating neural network effectiveness after pruning nodes indicated to be ineffective using Shapley and prior art analysis respectively.

The MSA may further be useful for pruning a neural network, by pruning the synapses according to the magnitude of their contributions, in ascending order. In Aharonov et al, Localization of function via lesion analysis, Neural Computation 15(4) 885–993 (2003), it is shown that pruning by the FCA contributions outperforms pruning by synaptic weights magnitude. To compare the contributions obtained by the MSA with those obtained by the FCA, we incrementally pruned the full recurrent synaptic network of S10 using the two methods. Reference is now made to FIG. 19 which depicts the performance of the agent as a function of the number of pruned synapses, starting from the intact network, and then steadily pruning according to the two methods. That is to say the graph shows Agent S10's performance as a function of pruning level, by MSA and by FCA. In both methods the synapses are incrementally pruned by ascending order of their contribution. The figure focuses on the first 80 synapses pruned, where the agent still has a viable performance level. Beyond 80 synapes, its performance drastically decreases with both methods of pruning. The MSA contributions are an estimated Shapley value, based on a random sample of 100 permutations. The FCA is trained with the same random sample.

As evident, the MSA tends to keep the performance higher than the FCA throughout the incremental pruning, testifying that it better captures the inherent importance of the synapses.

Two-Dimensional MSA

Two-Dimensional Interactions

The Shapley value serves as a summary of the complex system or game, indicating the average marginal importance of an element over all possible elements' permutations. For complex networks, where the importance of an element may depend on the state (perturbed or intact) of other elements, a higher order description may be necessary in order to capture sets of elements with significant interactions. For example, when two elements exhibit a high degree of functional overlap, that is, redundancy, it is necessary to capture this interaction, aside from the average importance of each element. Such high-dimensional analysis provides further insights into the network functional organization.

In the following we focus on the description of two-dimensional interactions. A natural definition of the interaction between a pair of elements is as follows: Let $\gamma_{i,[j]} = \gamma_i(N\setminus\{j\}, v^{N\setminus\{j\}})$ be the Shapley value of element i in the subsystem of all elements without element j. Intuitively, this is the average marginal importance of element i when element j is perturbed. Let us now define the coalitional system $(M, v^M)$, where $M=N\setminus\{i,j\}\cup\{(i,j)\}$ ((i,j) is a new compound element) and $v^M(S)$, for $S\subseteq M$, is $$v^M(S) = \begin{cases} v(S): & (i, j) \notin S \\ v(S \setminus \{(i, j)\} \cup \{i, j\}): & (i, j) \notin S \end{cases} \quad (13)$$

where v is the characteristic function of the original system with elements N. Then, $\gamma_{i,j} = \gamma_{(i,j)}$ (M,$v^M$), and the Shapley value of element (i,j) in this system is the average marginal importance of elements i and j when jointly added to a configuration. The two-dimensional interaction between element i and element j, j≠i, is then defined as $$I_{i,j} = \gamma_{i,j} - \gamma_{i,[\bar{j}]} - \gamma_{j,[\bar{i}]} \quad (14)$$

which quantifies how much is the average marginal importance of the two elements together larger (or smaller) than the sum of the average marginal importance of each of them when the other one is perturbed. Intuitively, this symmetric definition ($I_{i,j}=I_{j,i}$) states how much "the whole is greater than the sum of its parts" (synergism), where the whole is the pair of elements. In cases where the whole is smaller than the sum of its parts (for example, when two elements exhibit functional overlap), the interaction is negative (antagonism). This two-dimensional interaction definition coincides with the Shapley interaction index which is a more general measure for the interaction among any group of players [Grabisch RoubensGrabisch Roubens 1999].

The MSA further classifies the type of interaction between each pair. By definition, $\gamma_{i,[\bar{j}]}$ is the average marginal importance of element i when element j is perturbed. Based on equation (14), $\gamma_{i,[\bar{j}]}+I_{i,j}$ is the average marginal importance of element i when element j is intact. When both $\gamma_{i,[\bar{j}]}$ and $\gamma_{i,[\bar{j}]}+I_{i,j}$ are positive, element i's contribution is always positive, irrespective of whether element j is perturbed or intact. When both are negative, element i always hinders the performance, irrespective of the state of element j. In cases where the two measures have inverted signs, we define the contribution of element i as j-modulated. The interaction is defined as positively modulated when $\gamma_{i,[\bar{j}]}$ is negative, while $\gamma_{i,[\bar{j}]}+I_{i,j}$ is positive, causing a "paradoxical" effect. We define the interaction as negatively modulated when the former is positive while the latter is negative. The interaction of j with respect to i may be categorized in a similar way, yielding a full description of the type of interaction between the pair. Classical "paradoxical" lesioning effects of the kind reported in the neuroscience literature [SpragueSprague 1966, KapurKapur 1996] are defined when both elements exhibit positive modulation with respect to one another. As evident, this rigorous definition of the type of interaction relies on an average interaction over all perturbation configurations. Thus, it does not necessarily coincide with the type of interaction found by using only single perturbations and double perturbation of the pair, as conventionally described in the neuroscience literature. The two-dimensional definitions can be generalized in principle to higher dimensions in a similar manner.

A Two-Dimensional Analysis of an EAA

Figure 20:
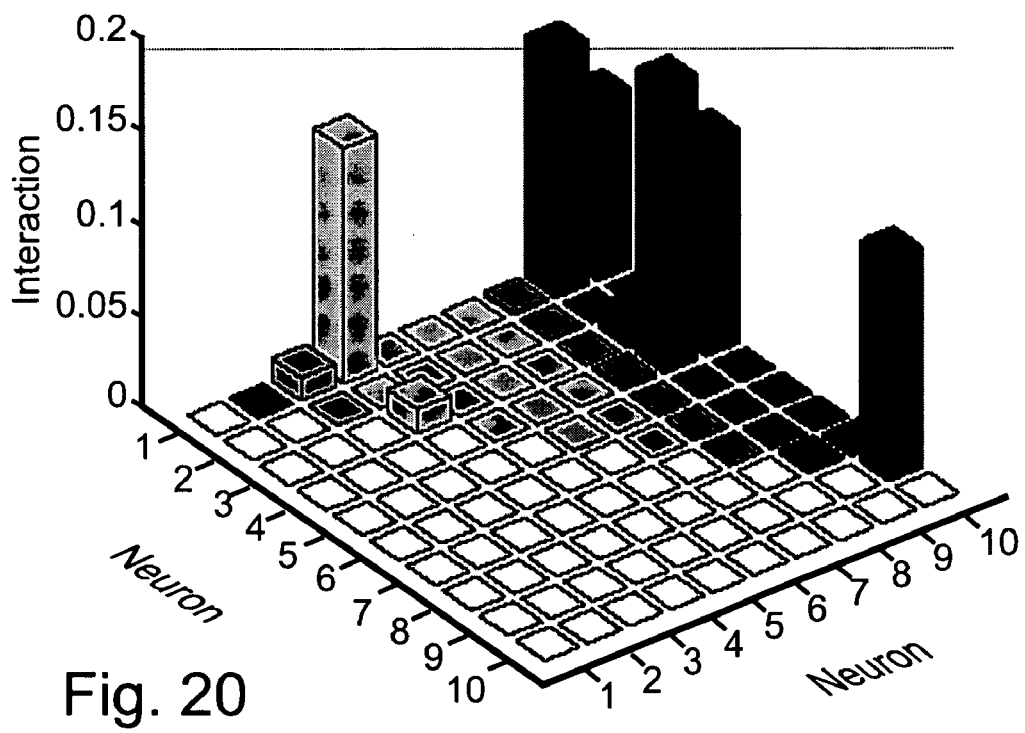
FIG. 20 is a graph illustrating the results of a 2D Shapley value analysis on one of the agents in the second neural network example.

Based on the two-dimensional interactions presented above, Reference is now made to FIG. 20 which graphically portrays the results of a two-dimensional analysis performed on agent W10, extending the one-dimensional analysis discussed Above. FIG. 20 shows two-dimensional interactions, and in particular the symmetric interaction $I_{i,j}$ between each pair of neurons (i<j).

Evidently, all pairs of significant neurons found previously in the one-dimensional analysis (1, 4, 9 and 10) exhibit strong synergism, while the pairs involving non-significant neurons exhibit weak synergism or very weak antagonism. Interestingly, the multitude of synergistic over antagonistic interactions indicates that there is an evolutionary pressure in these experiments towards the formation of cooperation between neurons.

Neurons number 4 and number 9, which participate in the counting process when waiting in a food cell, exhibit the strongest interaction. Further examining the marginal contributions of each with respect to the other, neuron number 9 has a very significant contribution of $\gamma_{9,[\bar{4}]}+I_{9,4}=0.16$ when neuron 4 is intact. When neuron number 4 is perturbed, neuron number 9 has a near-vanishing contribution of $\gamma_{9,[\bar{4}]}=0.005$, showing that neuron number 9 cannot count by itself, without neuron number 4. The opposite is also true, as neuron number 4 has a significant contribution of 0.15 when neuron number 9 is intact and a vanishing contribution when it is perturbed.

BIOLOGICAL EXAMPLE

MSA of Reversible Deactivation Experiments

To test the applicability of our approach to the analysis of biological "wet-ware" network data, we applied the MSA to data from reversible cooling deactivation experiments in the cat. Specifically, we investigated the brain localization of spatial attention to auditory stimuli based on the orienting paradigm described in Lomber et al, (2002) Restoration of Visual Orienting Into a Cortically Blind Hemifield By Reversible Deactivation of Posterior Parietal Cortex, or the Superior Colliculus, Exp Brain Res 142, 463-474, the contents of which are hereby incorporated by reference. Spatial attention is an essential brain function in many species, including humans, that underlies several other aspects of sensory perception, cognition, and behavior. While attentional mechanisms proceed efficiently, automatically and inconspicuously in the intact brain, perturbation of these mechanisms can lead to dramatic behavioral impairment. So-called neglect patients, for instance, have great difficulties, or even fail, to reorient their attention to spatial locations after suffering specific unilateral brain lesions, with resulting severe deficits of sensory (e.g., visual, auditory) perception and cognition [VallarVallar 1998]. From the perspective of systems neuroscience, attentional mechanisms are particularly interesting because this function is known to be widely distributed in the brain. Moreover, lesions in the attentional network have resulted in "paradoxical" effects [KapurKapur 1996], in which the deactivation of some elements resulted in a better-than-normal performance [Hilgetag Theoret, Pascual-LeoneHilgetag et al. 2001] or reversed behavioral deficits resulting from earlier lesions <e.g.,>sprague-66. Such effects challenge traditional approaches for lesion analysis and provide an ideal testbed for novel formal analysis approaches, such as the MSA.

In the reversible deactivation experiments analyzed here, auditory stimulus detection and orienting responses in intact and reversibly lesioned cats were tested in a semi-circular arena, in which small speakers were positioned bilaterally from midline (0) to 90 degrees eccentricity, at 15 degree intervals. The animals were first trained to stand at the center of the apparatus, facing and attending to the 0 degrees position speaker presenting a white noise hiss. Their subsequent task was to detect and orient toward noise coming from one of the peripheral speakers. They were rewarded with moist (high incentive) or dry (low incentive) cat food depending upon whether they correctly approached the peripheral stimulus or the default central position, respectively. After the animals attained a stable near-perfect baseline performance, cryoloops were surgically implanted over parietal cortical and collicular (SC) target structures, following an established standard procedure [Lomber, Payne HorelLomber et al. 1999]. Because these regions are found in both halves of the brain, altogether four candidate target sites existed ($PC_L$, $PC_R$, $SC_L$ and $SC_R$), one or two of which were deactivated during any one experiment. Once baseline performance levels were reestablished, the animals were tested during reversible cooling deactivation of unilateral and bilateral cortical and collicular sites. The technique allows for selective deactivation of just the superficial cortical or collicular layers, by keeping the cooling temperature to a level at which the deeper layers are still warm and active. Deactivation of the deeper layers, on the other hand, also requires deactivation of the superficial ones, due to the placement of the cryoloops on top of the cortical or collicular tissue. Nineteen single and multi-lesion experiments were performed, mostly as control experiments for the deactivation of visual structures, but also in their own right, and another 14 lesion configurations were deduced by assuming mirror-symmetric effects resulting from lesions of the two hemispheres, yielding data for a total of 33 single and multi-lesion experiments.

Reference is now made to FIG. 21, which is a simplified graph illustrating the results in terms of orientation achievement by the cats following the reversible deactivation experiments. The eight regions correspond to the parietal cortical and the SC of both sides, with separation between deep and superficial layers in each. FIG. 21A is a graph of predicted Shapley value of the eight regions respectively. Regions 6 and 8 represent $SC_R$-deep and $SC_L$-deep, respectively. FIG. 21B shows the symmetric interaction $I_{i,j}$ between each pair of regions (i<j).

More particularly, FIG. 21A shows the predicted Shapley value of the different regions involved in the experiments, using Projection Pursuit Regression (PPR) for prediction, and trained using the 33 configurations. It is evident that only regions $SC_R$-deep and $SC_L$-deep play a role in determining the auditory attentional performance. Both have a contribution equal to half the overall predicted performance of the system (0.2). Due to the outlined limitation of the experimental procedure, when a deep component of the SC is lesioned, the superficial one is lesioned as well (regions 5 and 7 in FIG. 21). Nevertheless, the MSA successfully reveals that only the deep SC regions are the ones of significance, which concurs with previous interpretations of collicular deactivation results, for example Lomber, Payne, ComwellLomber et al. 2001.

For comparison, FCA using the same experiments assigns different contributions in different runs. In most runs, it uncovers the role played by the deep SC regions. Alas, it usually also assigns non-vanishing contributions to the superficial SC regions. Furthermore, in some runs it assigns significant contributions to the PC regions. This comparison between the results testify to the disadvantages of an operative approach such as the FCA. Such disadvantages are overcome by the MSA in that it offers a unique fair solution for the contribution.

We further performed a two-dimensional MSA to quantify the interactions between each pair of regions, finding only one significant interaction, between $SC_R$-deep and $SC_L$-deep, $I_{6,8}=0.8$ (FIG. 21B). Furthermore, observing the negative contribution of each of the two regions when the other one is lesioned ($\gamma_{6,[8]}=\gamma_{8,[6]}=-0.3$) and the positive contribution when the other one is intact ($\gamma_{6,[8]}+I_{6,8}=\gamma_{8,[6]}+I_{8,6}=0.5$), the MSA concludes that each of the two regions is positively modulated by the other, uncovering the type of interaction assumed to take place in this system [Hilgetag, Kotter, YoungHilgetag et al. 1999, Hilgetag, Lomber, PavneHilgetag et al. 2000, Lomber. Payne, ComwellLomber et al. 2001]. The prediction made by the MSA to lesioning configurations that were not performed in the experiments is that lesioning either one of the deep SC regions results in large deficit in (contralateral) spatial attention to auditory stimuli, while lesioning both results in a much smaller deficit. Lesioning any subgroup of the other regions involved in these experiments does not influence the performance in this task. In particular, it is predicted that as long as the deep SC regions are intact, the animal will exhibit full orientation performance, even when some or all of the superficial collicular layers, the superficial parietal cortical layers and the deeper parietal cortical layers are lesioned. This analysis testifies to the usefulness of the MSA in deducing the functionally important regions as well as their significant interactions.

Studying a Genome

Figure 22:
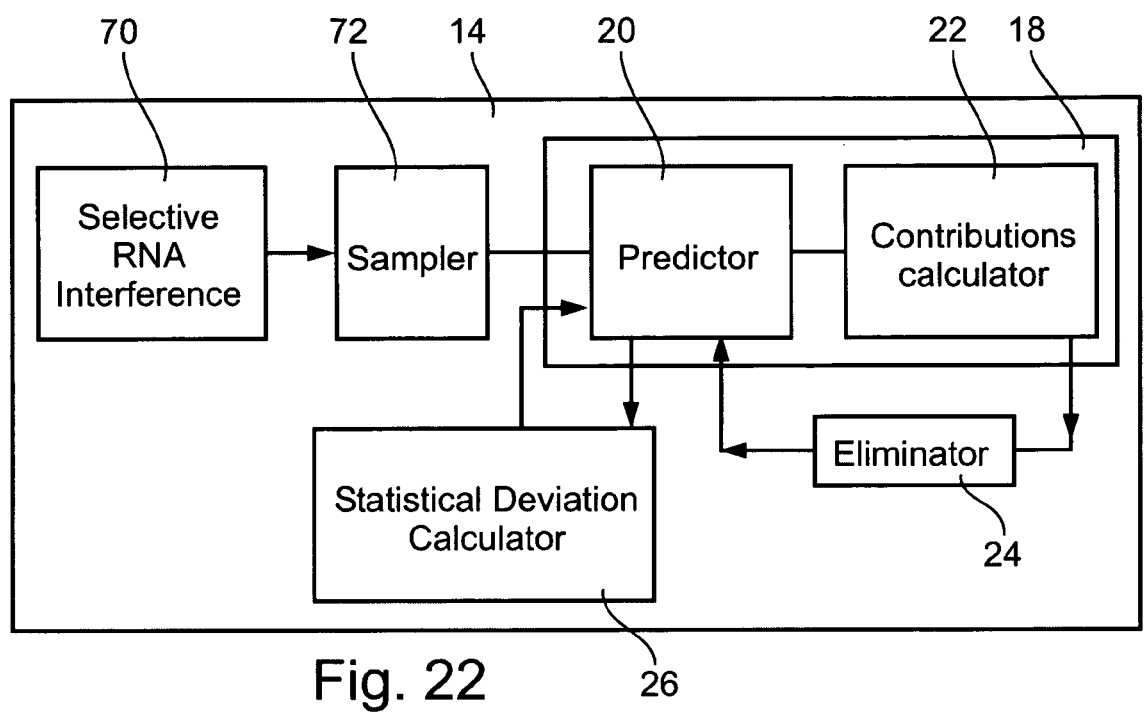
FIG. 22 is a simplified schematic diagram illustrating apparatus for carrying out RNAi analysis on genomic material.

Reference is now made to FIG. 22, which is a simplified diagram illustrating an apparatus for studying a genome by multi-silencing analysis. The apparatus is the same as that shown in FIG. 1 or FIG. 2 except for the complex system sampling part. A selective RNA interference unit 70 provides RNA deactivation in relation to specific genes, the elements, of the genome being studied. The user is able to select the combination of genes to be knocked out for any given experiment. The genome is then left to operate and task outputs are measured by sampler 72. The task outputs are then translated into contributions of the individual genes using any of the methodologies outlined herein, by use of Predicted Shapley values, of estimated predicted Shapley values, of two stage predicted Shapley value estimation, or of two stage estimated predicted Shapley value estimation. It will be appreciated that for any reasonable size genome, the cost and time of carrying out experiments covering all, or even a reasonably substantial subset of combinations, is prohibitive.

It will be appreciated that RNAi is not the only way of applying silencing analysis to a genome, but it is especially advantageous when numerous combinations are involved.

Studying a Genome Example. Analysis of RFC-like complexes in the Yeast Genome.

RFC and RFC like complexes are used for loading of DNA polymerase for DNA repair. There are three 3 RFC-like complexes: ELG1, CTF18 and RAD24 which are required for resistance to UV radiation. There possibly exists an alternative post-replication repair (PPR) pathway. It is also desirable to study the interactions of the RFC-like complexes with SRS2 and REV3, of which REV3 is a DNA polymerase, required for PPR, and SRS2 probably regulates the channeling of the PPR.

Multi-silencing analysis was carried out on the genome by carrying out all possible deletion combinations.

The deletions combinations led to three gene sets as follows:
  1. ELG1, CTF18, RAD24 (Basic set)
  2. ELG1, CTF18, RAD24 and REV3 (REV set)
  3. ELG1, CTF18, RAD24 and SRS2 (SRS set)

Performance was measured by studying the resistance of the resulting cell to UV radiation, thus the more sensitive to UV radiation the less resistance.

The methodology was carried out in order to provide answers to the following questions:

The role of the RFC-like complexes in PPR

What is their relation (interaction) with REV3 and SRS2?

What can be learned about the functional roles of the RFC-like complexes?

Figure 23:
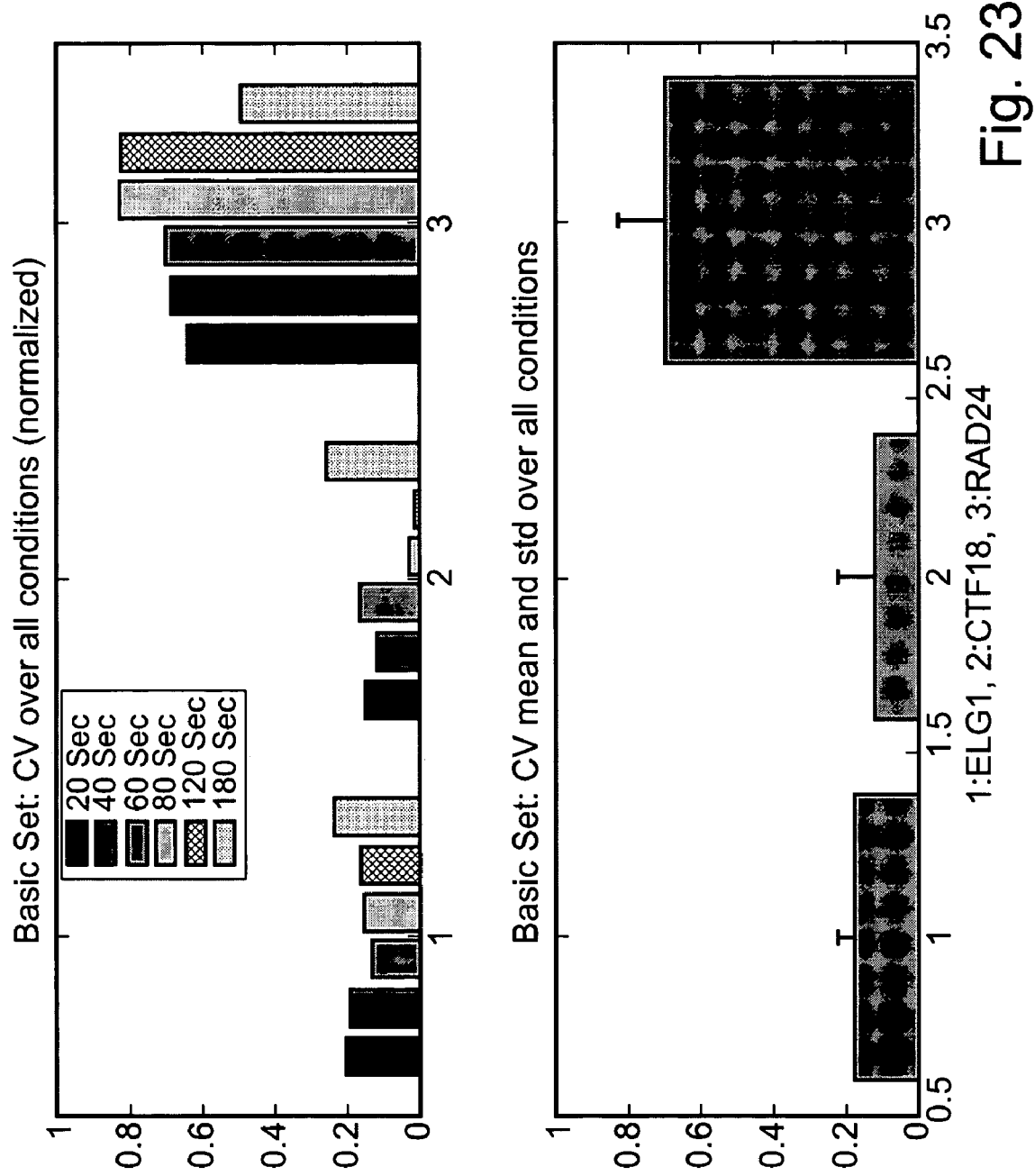
Figure 25:
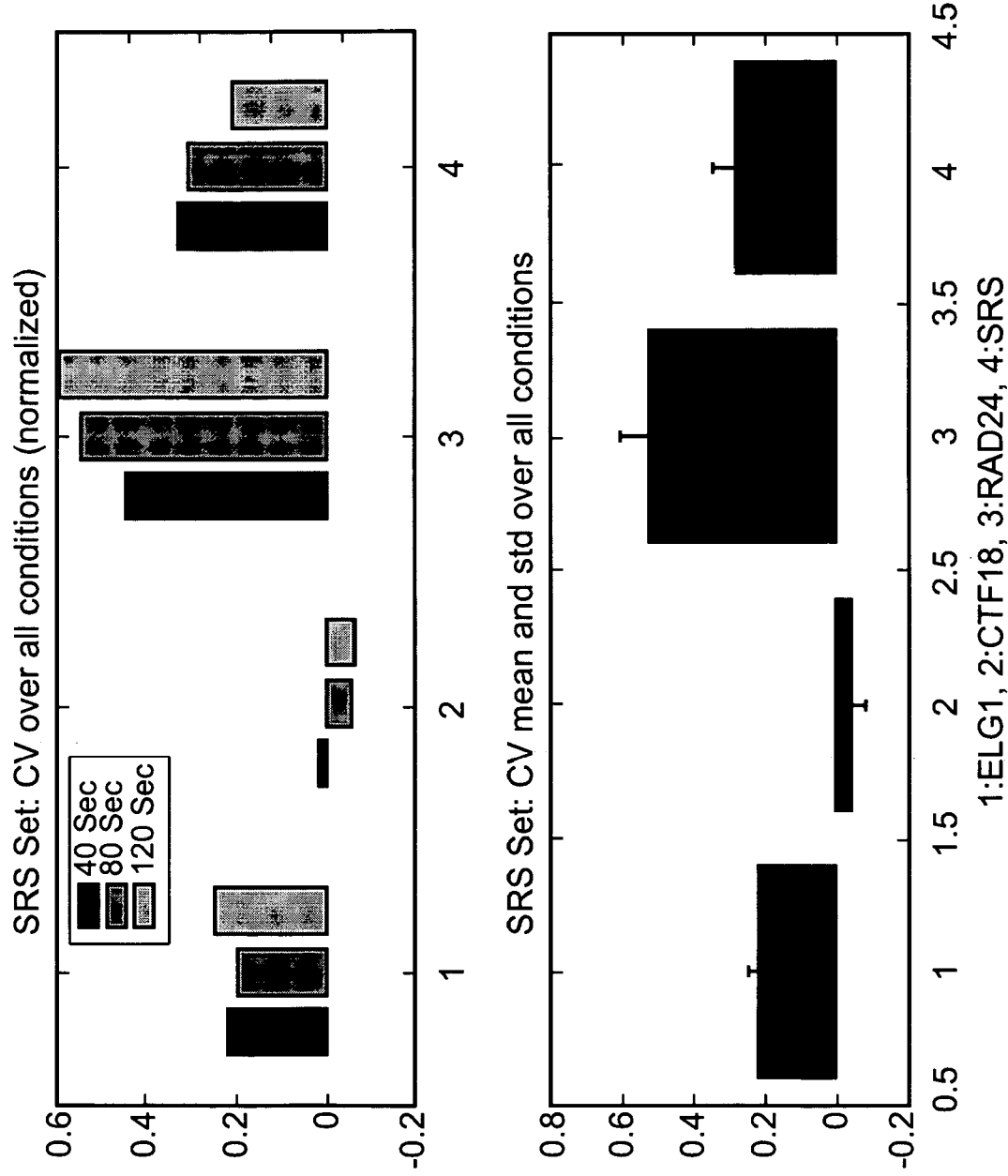

Reference is now made to FIG. 23, which shows the results of different amounts of irradiation carried out on the basic genome set as defined above. FIG. 24 shows the identical information for the REV set as defined above. FIG. 25 shows the identical information for the SRS2 set.

Figure 26:
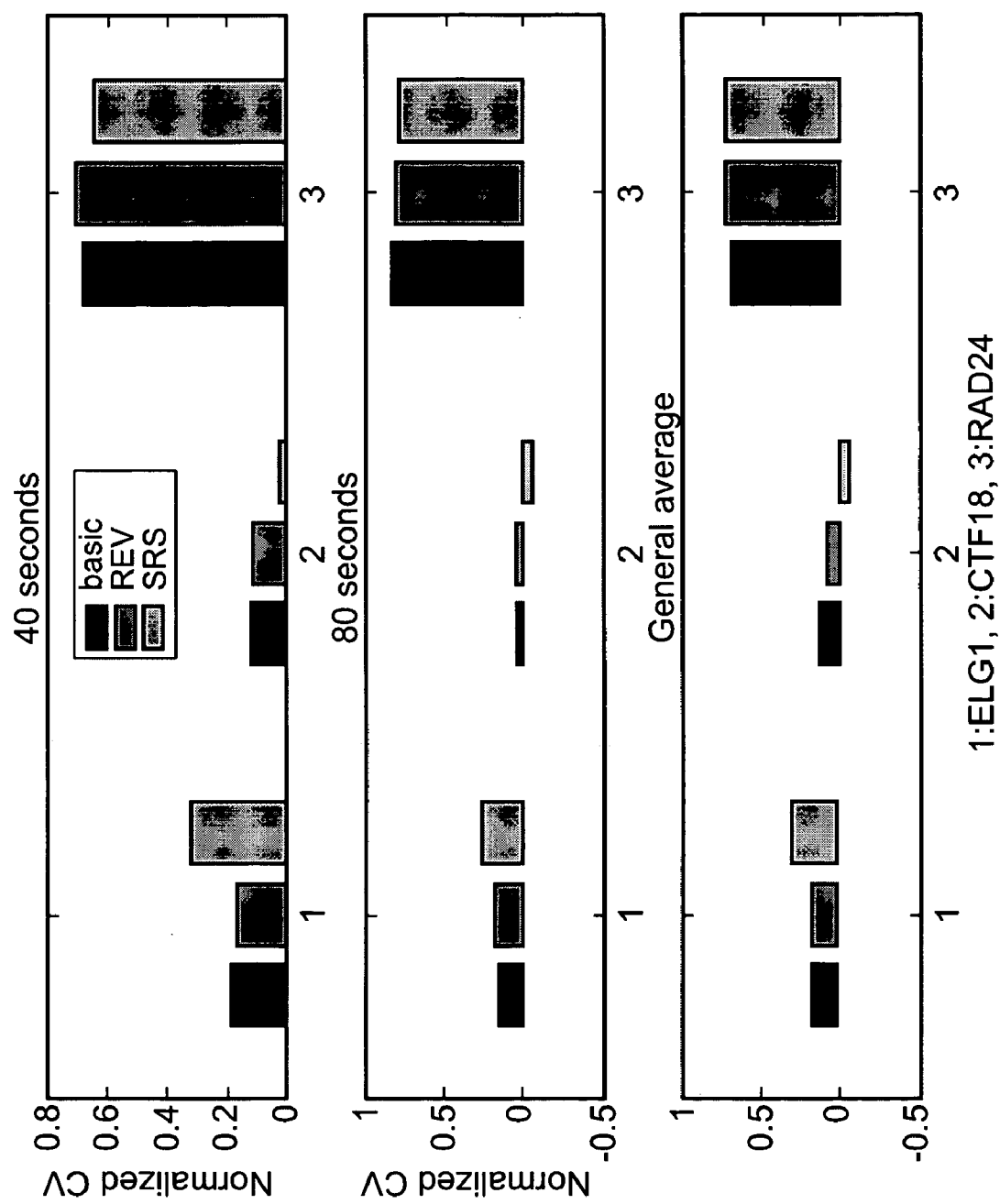

FIG. 26 is a graph showing the changes in output levels between the three sets above.

The above results suggest the following conclusions:

All RFC-like complexes play a positive role in PPR.

When REV3 & SRS2 are introduced the interaction-complexity grows.

The 3 RFC-like complexes interact with REV3 & SRS2.

REV3 has a positive interaction with all 3 RFC-like complexes suggesting that possibly it acts in the same way as RFC and loads the DNA polymerase.

SRS2 implies very complex interactions also within the triplet and possibly regulates the pathways.

Study of Biochemical Pathways in Red Blood Cells.

A further study was carried out on biochemical pathways in red blood cells (RBC). The study was an RBC dynamic simulation simulated using ODE solving algorithms and was dynamically simulated, always starting from the normal steady state concentrations. The reason RBC was chosen was because it is a well-understood environment in which the ODE parameters are widely agreed upon, and therefore it provides an effective laboratory to test the effectiveness of the Shapley value tool of the present embodiments.

The model covers the following features of the red blood cell dynamics, namely

Glycolysis; pentose phosphate pathway; adenosine metabolism; Na/K pump

The model does not include hemoglobin binding; or osmotic pressure and electroneutrality constraints 34 metabolites and ions 44 "reactions" (35 enzymes catalyzed, 6 transport channels, Na & K leaks, pump)

Figure 27:
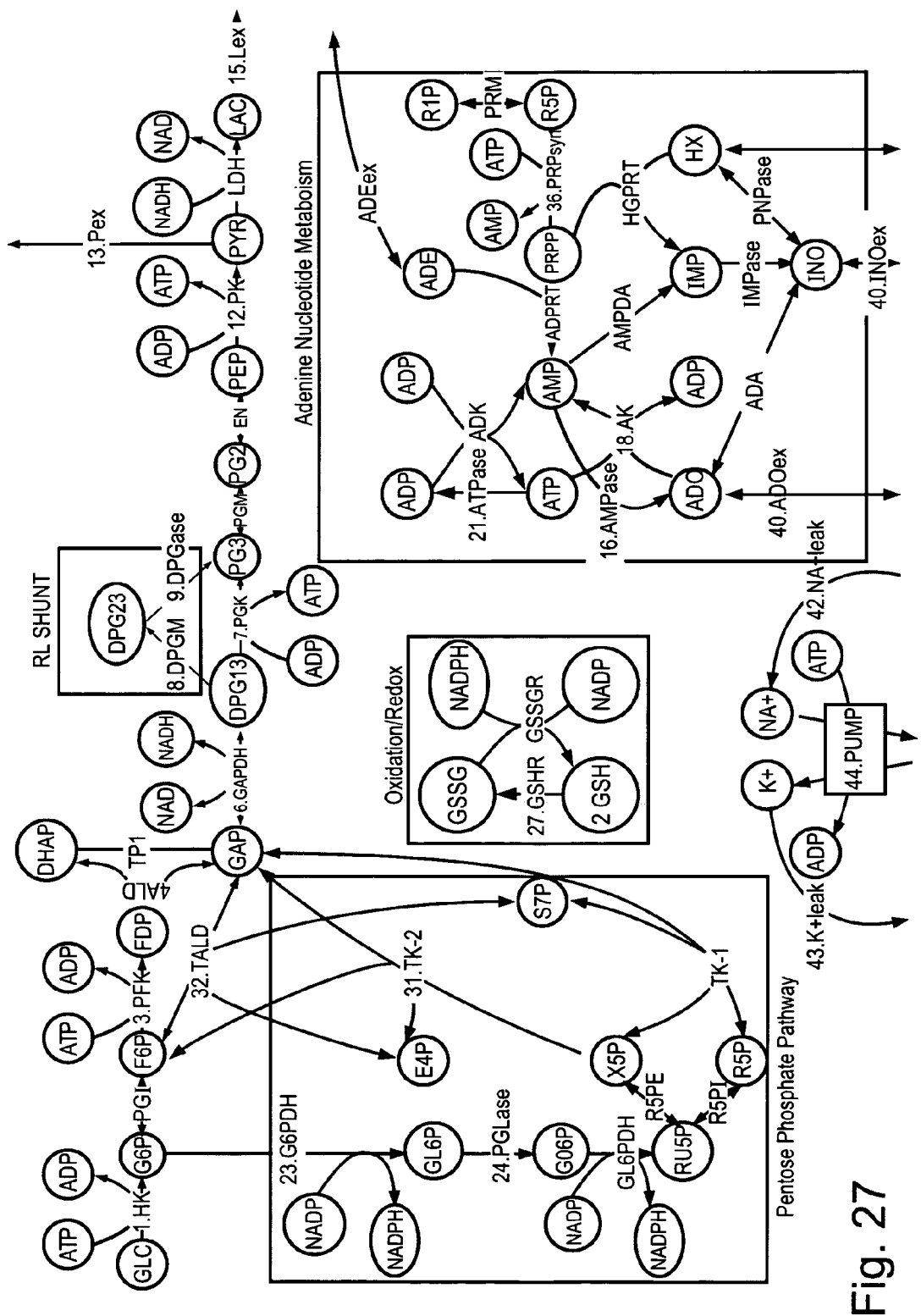
FIG. 27 is a simplified schematic diagram illustrating metabolic pathways involved in the dynamics of red blood cells.

A schematic of the RBC environment is shown in FIG. 27.

Perturbations were performed in the model by reducing the activity (flow) in the 44 reactions by some constant rate. Performance after each lesion experiment was measured by determining the maximum bearable metabolic load that the RBC model could handle in its lesioned state.

Figure 28:
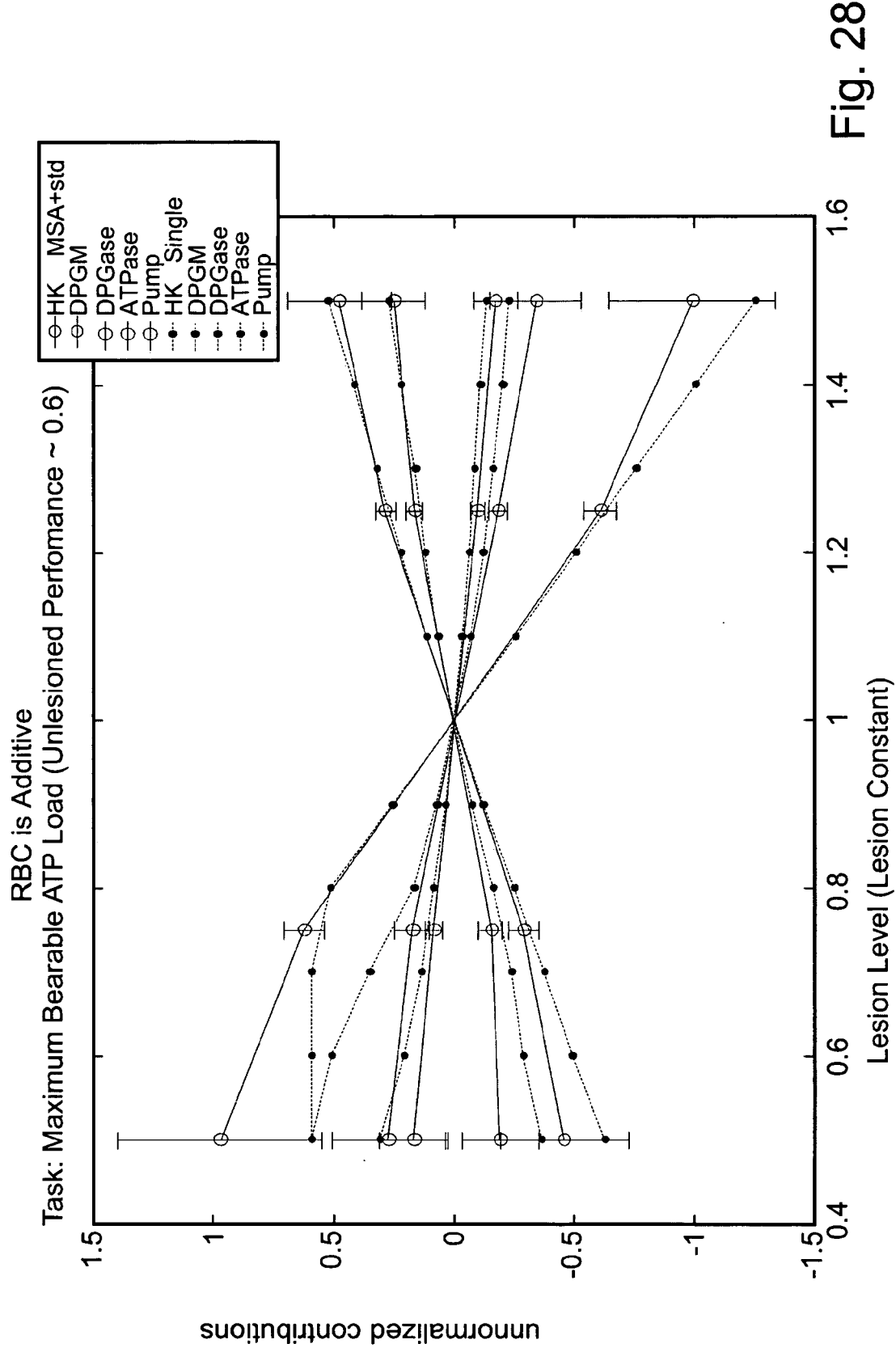
FIGS. 28–30 show the results of silencing various of the red blood cell metabolic pathways against given tasks measured at the red blood cells.
Figure 29:
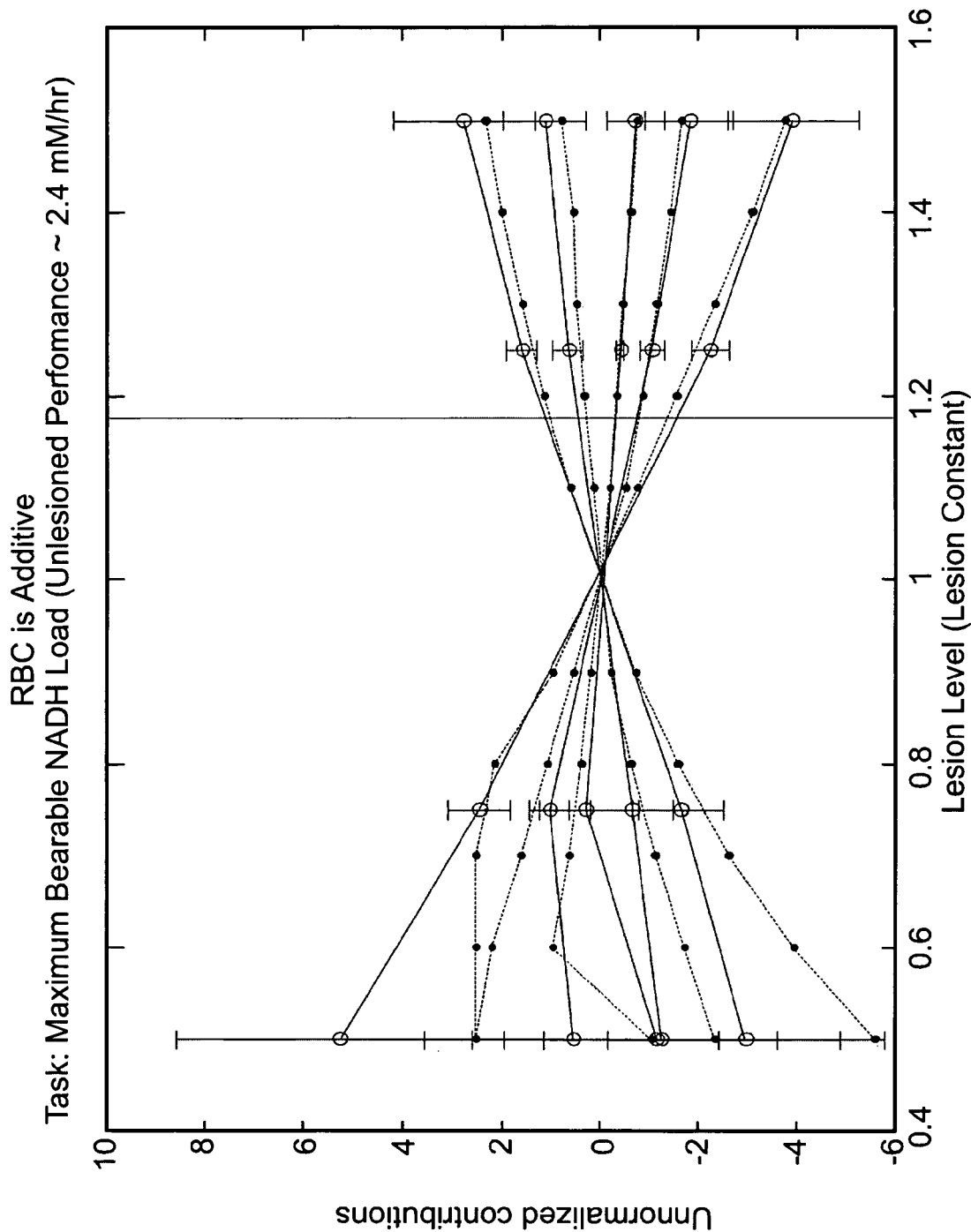
Figure 30:
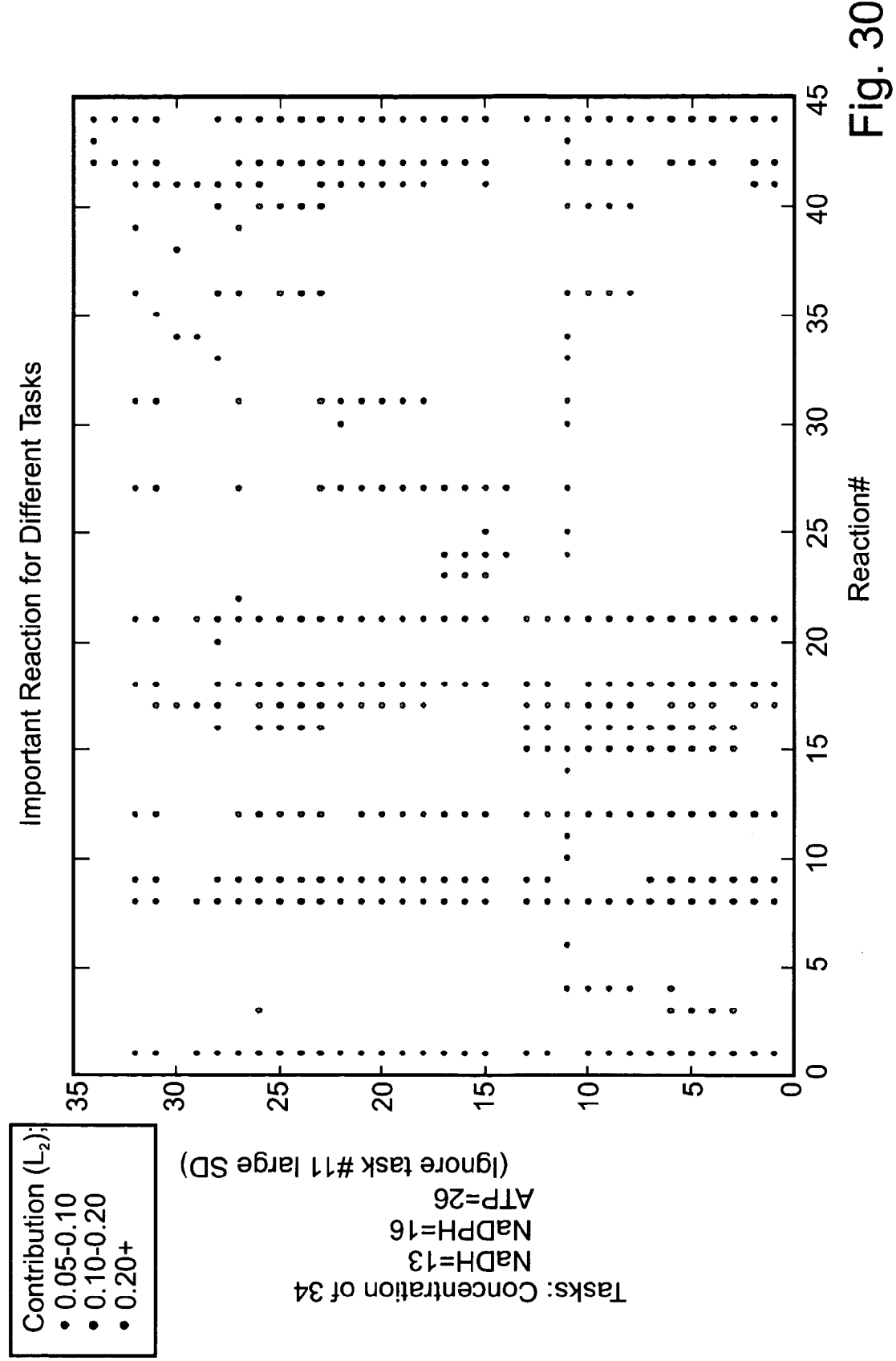

The application of multi-lesion Shapley analysis to the above has revealed two basic kinds of results:

A fixed set of 5 "core" reactions, including Hexokinase, R-L bypass, ATPase, $Na^+/K^+$ pump A small, restricted set of <15 (30%) reactions solely determining the performance, in a range of tasks The results attained are shown in FIGS. 28, 29 and 30, which respectively show maximum bearable ATP load for different lesion rates, maximum bearable NADH load for different lesion rates and overall results for the Concentration Change (CC) test and for the Localizing of reaction/enzyme effects on each metabolite/ion.

The data above shows only single dimensional or additive results. There may be synergistic effects too, but only preliminary information is currently available.

DISCUSSION

The presently preferred embodiments provide a new framework for quantitative causal function localization via multi-perturbation experiments [Aharonov Segev, Meilijson, RuppinAharonov et al. 2003, Segev, Aharonov, Meilijson, RuppinSegev et al. 2003, Keinan, Meilijson, RuppinKeinan et al. 2003]. Indeed the present embodiments provide an axiomatic framework for multi-silence analysis based on a rigorous definition of all elements' contributions via the Shapley value. The latter is a fundamental concept borrowed from game theory, which has been classically used for providing fair solutions to cost allocation problems. The MSA accurately approximates the Shapley value in a scalable manner, making it a more accurate and efficient method for function localization than its predecessor, the FCA. The prediction and estimation variants of the MSA developed in this study are especially suitable for experimental biological applications, in which only a limited number of multi-perturbation experiments, and a limited number of computations, can be performed.

As demonstrated herein, the different MSA variants are capable of efficiently and accurately identifying the contributions of a fairly large EAA network, consisting of a hundred synaptic elements, spanning a space of $2^{100}$ possible perturbation configurations. We also showed that the MSA framework is capable of dealing with behavioral data from experimental deactivation studies of the cat brain, quantitatively identifying the main interaction underlying a "paradoxical" lesioning phenomenon observed previously in studies of spatial attention [Hilgetag, Kotter, YoungHilgetag et al. 1999, Hilgetag, Lomber, PayneHilgetag et al. 2000, Lomber, Payne CornwellLomber et al. 2001]. The work is important for biological systems because A. Localization of function is an important first step in understanding the operation of biological networks. B. This task requires perturbations in order to identify localization in a causal manner. Importantly, it requires multi-perturbation approaches if one aims to correctly identify the contributions and multiple interactions in even mildly complex biological networks. C. The different MSA variants are the first methods that offer a strategy to perform such analyses in a formal, fair and scalable manner, and they may play a primary role in future such studies.

As pointed out previously, and as evident from effects such as "paradoxical" lesion phenomena, single lesion approaches do not suffice to portray the correct function localization in a network. Why then have the great majority of lesioning studies in neuroscience up until now relied on single lesioning solely?

A. It has been very difficult (and in many systems, practically impossible) to reliably create and test multiple lesions.

B. Moreover, single lesion studies have been perceived as already being fairly successful in providing insights to the workings of neural systems. Naturally, the lack of more rigorous multi-lesion analysis has made the testing/validation of this perception practically impossible, and it may well have been the case that the lack of a multi-lesion analysis method has made such experiments seem futile. We hope that at least this last obstacle has been remedied by the introduction of MSA according to the present embodiments.

But the question remains; have we reached the stage where we can now perform multi-perturbation experiments and corresponding analyses of biological networks? We believe that the answer is affirmative, and newly introduced experimental tools hold great promise, both in neuroscience and for the analysis of genetic and metabolic networks. In neuroscience, one can now perform a series of reliable reversible deactivation experiments in animal studies. Even more exciting is the prospect of carrying out comparable experimental perturbation studies in human subjects using the non-invasive technique of Transcranial Magnetic Stimulation (TMS). This technique allows to induce "virtual lesions" in normal subjects performing various cognitive and perceptual tasks [Pascual-Leone, Wasserman, Davey RothwellPascual-Leone et al. 2002, RafalRafal 2001]. The methodology can be utilized to co-deactivate doublets of brain sites [Hilgetag et al. Hilgetag et al. 2003] and potentially even triplets. Additionally, recent retrospective lesion studies of stroke patients have reconstructed patients' lesions and analyzed the resulting multi-lesion data using statistical tools. Such data may be more rigorously analyzed by the MSA, processing the multi-lesion data to capture the contributions of and the significant high-dimensional interactions between regions or voxels. Going beyond the realm of neuroscience to biology in general, the recent discovery of RNA interference (RNAi) [Hammond, Caudy Hannon-Hammond et al. 2001, CouzinCouzin 2002] has made the possibility of multiple concomitant gene knockouts a reality. Using RNAi vectors it is now possible to reversibly block the transcription of specified genes for a certain duration and measure the response/performance of various cellular and metabolic indices of the cell, including the expression levels of other genes. Multi-perturbation studies are a necessity, and they are hence bound to take place, starting in the very near future. The MSA framework presented in this paper is a harbinger of this new kind of studies, offering a novel and rigorous way of making sense out of them.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for analysis of a complex system comprising elements, to determine the effective elements of a system in carrying out a given task, the apparatus comprising:

a sampler for sampling a system to which successive silencing operations comprising silencing elements and combinations of elements of the system are applied under said given task to obtain sampling results, a predictor for providing predictions for predicting results for the given task for further element silencing combinations, and a contributions calculator for using said measured results and said predicted results to generate Shapley value predictions for said elements as indicators of an effectiveness of a respective element in carrying out the given task.

2. The apparatus of claim 1, wherein said predictor is trainable on said sampling results.

3. The apparatus of claim 2, wherein said predictor is operable to complete said measured results by predicting further results to produce a complete overall set of measured and predicted results representing all possible silencing combinations of said elements in said system, said complete set of outputs being usable within said contributions calculator for calculations of Shapley values for each element.

4. The apparatus of claim 2, further comprising a statistical deviation calculator, associated with at least one of said system analyzer and said predictor, and configured to use confidence interval analysis to indicate a sufficient number of results to enable statistically meaningful Shapley values to be calculated.

5. The apparatus of claim 1, wherein said predictor is Functional Contribution Analysis (FCA).

6. The apparatus of claim 1, wherein said predictor is projection pursuit regression (PPR).

7. The apparatus of claim 1, wherein said complex system is any one of an economic system, a biological system, a virtual system, a physical system, a chemical system, a control system, a system comprising neural networks, neurological system, a biochemical system, a genetic system, an electronic system, and a cost-based system.

8. The apparatus of claim 1, wherein said successive silencing operations are any one of a group comprising lesion operations, reversible lesion operations, multi-gene knockout operations, mutation operations, RNA interference operations, Transcranial Magnetic Stimulation (TMA) operations, physical shutdown operations, biochemical interference activity, perturbation analysis, and bioelectrical interference activity.

9. The apparatus of claim 1, further comprising an eliminator, located between said predictor and said contributions calculator for using outputs of said contributions calculator to identify elements providing minimal contribution, to eliminate said elements at said predictor and to operate said predictor to make new predictions for combinations of elements determined to be significant, thereby to provide a two-stage analysis process.

10. Method for analysis of a complex system comprising elements to determine the effective elements of a system in carrying out a given task, the method comprising:

carrying out successive silencing operations comprising silencing elements and combinations of elements of the system, measuring results of the given task under respective silencing operations, providing predictions for predicting results for the given task for further element silencing combinations, and using said measured results and said predicted results to generate Shapley value predictions for said elements as indicators of an effectiveness of a respective element in carrying out the given task.

11. Apparatus for genomic analysis of a genetic system comprising a plurality of genetic elements, each element being a genetic element being silenceable via genetic knockout operations to determine the effective elements of a system in carrying out a given task, the apparatus comprising:

genetic knockout unit for carrying out successive silencing operations comprising silencing combinations of at least one of selected genetic elements, a sampler for measuring results of the given task following a given silencing combination, a predictor for providing predictions for predicting results for the given task for further element silencing combinations, and a contributions calculator for using said measured results and said predicted results to generate Shapley value predictions for said genetic elements as indicators of an effectiveness of a respective genetic element in carrying out the given task.

12. The apparatus of claim 11, wherein said genetic knockout operation is silencing of a corresponding RNA pathway and said genetic knockout unit is an RNA interference unit.

13. The apparatus of claim 11, wherein said genetic knockout operation is mutation and said genetic knockout unit is a mutator.

* * * * *